(12) United States Patent
Purwar et al.

(10) Patent No.: US 10,574,883 B2
(45) Date of Patent: Feb. 25, 2020

(54) SYSTEM AND METHOD FOR GUIDING A USER TO TAKE A SELFIE

(71) Applicants: The Procter & Gamble Company, Cincinnati, OH (US); Palo Alto Research Center Incorporated, Palo Alto, CA (US)

(72) Inventors: Ankur N M N Purwar, Singapore (SG); Paul Jonathan Matts, Addlestone (GB); Matthew Adam Shreve, Webster, NY (US); Wencheng N M N Wu, Webster, NY (US)

(73) Assignees: The Procter & Gamble Company, Cincinnati, OH (US); Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 15/993,973

(22) Filed: May 31, 2018

(65) Prior Publication Data
US 2018/0352150 A1    Dec. 6, 2018

Related U.S. Application Data

(60) Provisional application No. 62/513,220, filed on May 31, 2017.

(51) Int. Cl.
*H04N 5/232* (2006.01)
*G06K 9/00* (2006.01)
(Continued)

(52) U.S. Cl.
CPC ..... *H04N 5/23222* (2013.01); *G06K 9/00248* (2013.01); *G06K 9/00255* (2013.01);
(Continued)

(58) Field of Classification Search
None
See application file for complete search history.

(56) References Cited

U.S. PATENT DOCUMENTS 4,276,570 A    6/1981    Burson et al.
5,850,463 A    12/1998    Horii
(Continued)

FOREIGN PATENT DOCUMENTS

CN    1870047 A    11/2006
CN    101556699 A    10/2009
(Continued)

OTHER PUBLICATIONS

Y. Fu, G. Guo, and T. S. Huang, "Age synthesis and estimation via faces: A survey," Pattern Analysis and Machine Intelligence, IEEE Transactions on, vol. 32, No. 11, pp. 1955-1976, 2010.
(Continued)

*Primary Examiner* — Kate H Luo
(74) *Attorney, Agent, or Firm* — John G. Powell

(57) ABSTRACT

Systems and methods for improving the image quality of a selfie. The system and method include analyzing a selfie with image processing modules and selfie quality index modules. The image processing modules process the image using face and landmark detection techniques and face normalization techniques. The selfie quality index modules analyze the selfie for important image quality metrics and provide feature vectors that are used to generate a selfie quality index score. The selfie quality index score can be used to determine whether the selfie meet minimum threshold quality requirement for further analysis by the system for a skin condition.

12 Claims, 10 Drawing Sheets

(51) Int. Cl.
  *G06K 9/20* (2006.01)
  *G06T 7/194* (2017.01)
  *G06T 7/536* (2017.01)
  *G06K 9/42* (2006.01)
  *G06K 9/03* (2006.01)
  *G06K 9/46* (2006.01)
  *H04N 5/445* (2011.01)

(52) U.S. Cl.
  CPC ......... *G06K 9/00281* (2013.01); *G06K 9/036* (2013.01); *G06K 9/2081* (2013.01); *G06K 9/42* (2013.01); *G06K 9/4661* (2013.01); *G06T 7/194* (2017.01); *G06T 7/536* (2017.01); *H04N 5/23293* (2013.01); *H04N 5/445* (2013.01); *G06K 9/00302* (2013.01); *G06T 2207/20081* (2013.01); *G06T 2207/20084* (2013.01); *G06T 2207/30168* (2013.01); *G06T 2207/30201* (2013.01); *G06T 2207/30242* (2013.01)

(56) References Cited

U.S. PATENT DOCUMENTS

| | | |
|---|---|---|
| 5,983,120 A | 11/1999 | Groner et al. |
| 6,556,196 B1 | 4/2003 | Blanz et al. |
| 6,571,003 B1 | 5/2003 | Hillebrand et al. |
| 6,619,860 B1 | 9/2003 | Simon |
| 6,734,858 B2 | 5/2004 | Attar et al. |
| 6,761,697 B2 | 7/2004 | Rubinstenn et al. |
| 6,959,119 B2 | 10/2005 | Hawkins et al. |
| 7,200,281 B2 | 4/2007 | Zhang et al. |
| 7,362,886 B2 | 4/2008 | Rowe |
| 7,634,103 B2 | 12/2009 | Rubinstenn et al. |
| 8,014,589 B2 | 9/2011 | del Valle |
| 8,077,931 B1 | 12/2011 | Chatman |
| 8,094,186 B2 | 1/2012 | Fukuoka et al. |
| 8,254,647 B1 | 8/2012 | Nechyba |
| 8,391,639 B2 | 3/2013 | Hillebrand et al. |
| 8,401,300 B2 | 3/2013 | Jiang et al. |
| 8,425,477 B2 | 4/2013 | Mou |
| 8,491,926 B2 | 7/2013 | Mohammadi et al. |
| 8,520,906 B1 | 8/2013 | Moon |
| 8,550,818 B2 | 10/2013 | Fidaleo et al. |
| 8,582,807 B2 | 11/2013 | Yang |
| 8,625,864 B2 | 1/2014 | Goodman |
| 8,666,770 B2 | 3/2014 | Maes et al. |
| 8,725,560 B2 | 5/2014 | Aarabi |
| 9,013,567 B2 | 4/2015 | Clemann |
| 9,189,679 B2 | 11/2015 | Yamazaki |
| 2001/0037191 A1 | 11/2001 | Furuta et al. |
| 2003/0065255 A1 | 4/2003 | Giacchetti et al. |
| 2003/0065589 A1 | 4/2003 | Giacchetti et al. |
| 2003/0198402 A1 | 10/2003 | Zhang |
| 2004/0122299 A1 | 6/2004 | Nakata |
| 2004/0170337 A1 | 9/2004 | Simon et al. |
| 2004/0213454 A1 | 10/2004 | Lai et al. |
| 2004/0223631 A1 | 11/2004 | Waupotitsch |
| 2006/0023923 A1 | 2/2006 | Geng |
| 2006/0257041 A1 | 11/2006 | Kameyama et al. |
| 2006/0274071 A1 | 12/2006 | Bazin |
| 2007/0052726 A1 | 3/2007 | Wright |
| 2007/0053940 A1 | 3/2007 | Huang et al. |
| 2007/0070440 A1 | 3/2007 | Li et al. |
| 2007/0071314 A1 | 3/2007 | Bhatti |
| 2007/0104472 A1 | 5/2007 | Quan |
| 2007/0229498 A1 | 10/2007 | Matusik et al. |
| 2008/0080746 A1 | 4/2008 | Payonk |
| 2008/0089561 A1* | 4/2008 | Zhang ............... G06K 9/00228 382/118 |
| 2008/0194928 A1 | 8/2008 | Bandic |
| 2008/0212894 A1 | 9/2008 | Demirli |
| 2008/0316227 A1 | 12/2008 | Fleury et al. |
| 2009/0003709 A1* | 1/2009 | Kaneda ............... G06K 9/4628 382/190 |
| 2009/0028380 A1 | 1/2009 | Hillebrand |
| 2009/0245603 A1 | 10/2009 | Koruga |
| 2010/0068247 A1 | 3/2010 | Mou |
| 2010/0172567 A1 | 7/2010 | Prokoski |
| 2010/0185064 A1 | 7/2010 | Bandic |
| 2010/0189342 A1 | 7/2010 | Parr et al. |
| 2010/0329525 A1 | 12/2010 | Goodman |
| 2011/0016001 A1 | 1/2011 | Schieffelin |
| 2011/0064331 A1 | 3/2011 | Andres del Valle |
| 2011/0116691 A1 | 5/2011 | Chung |
| 2011/0158540 A1* | 6/2011 | Suzuki ............... G06K 9/00281 382/195 |
| 2011/0196616 A1 | 8/2011 | Gunn |
| 2011/0222724 A1 | 9/2011 | Yang |
| 2011/0249891 A1 | 10/2011 | Li |
| 2011/0300196 A1 | 12/2011 | Mohammadi |
| 2012/0223131 A1 | 9/2012 | Lim |
| 2012/0253755 A1 | 10/2012 | Gobel |
| 2012/0300049 A1 | 11/2012 | Clemann |
| 2012/0325141 A1 | 12/2012 | Mohammadi |
| 2013/0013330 A1 | 1/2013 | Guerra |
| 2013/0029723 A1* | 1/2013 | Das ............... H04M 1/72569 455/557 |
| 2013/0041733 A1 | 2/2013 | Officer |
| 2013/0079620 A1 | 3/2013 | Kuth et al. |
| 2013/0089245 A1 | 4/2013 | Yamazaki et al. |
| 2013/0094780 A1 | 4/2013 | Tang et al. |
| 2013/0158968 A1 | 6/2013 | Ash et al. |
| 2013/0169621 A1 | 7/2013 | Mei et al. |
| 2013/0271451 A1 | 10/2013 | Tong |
| 2013/0325493 A1 | 12/2013 | Wong et al. |
| 2014/0089017 A1 | 3/2014 | Klappert et al. |
| 2014/0099029 A1 | 4/2014 | Savvides |
| 2014/0201126 A1 | 7/2014 | Zadeh |
| 2014/0209682 A1 | 7/2014 | Gottwals et al. |
| 2014/0211022 A1 | 7/2014 | Koh et al. |
| 2014/0219526 A1 | 8/2014 | Linguraru et al. |
| 2014/0226896 A1 | 8/2014 | Imai |
| 2014/0270490 A1 | 9/2014 | Wus et al. |
| 2014/0304629 A1 | 10/2014 | Cummins et al. |
| 2014/0323873 A1 | 10/2014 | Cummins et al. |
| 2014/0334723 A1 | 11/2014 | Chatow |
| 2015/0045631 A1 | 2/2015 | Pederson |
| 2015/0099947 A1 | 4/2015 | Qu |
| 2015/0178554 A1 | 6/2015 | Kanaujia et al. |
| 2015/0310040 A1* | 10/2015 | Chan ............... G06F 16/583 707/738 |
| 2015/0339757 A1 | 11/2015 | Aarabi |
| 2016/0062456 A1* | 3/2016 | Wang ............... G06F 21/32 382/117 |
| 2016/0162728 A1 | 6/2016 | Arai et al. |
| 2016/0219217 A1* | 7/2016 | Williams ........... H04N 5/23293 |
| 2016/0255303 A1* | 9/2016 | Tokui ............... H04N 21/4223 348/14.01 |
| 2016/0292380 A1 | 10/2016 | Cho |
| 2016/0314616 A1 | 10/2016 | Su |
| 2016/0330370 A1* | 11/2016 | Ghosh ............... G06K 9/00221 |
| 2017/0032178 A1* | 2/2017 | Henry ............... G06T 11/60 |
| 2017/0039357 A1* | 2/2017 | Hwang ............... G06F 21/32 |
| 2017/0178058 A1* | 6/2017 | Bhat ............... G06Q 10/087 |
| 2017/0246473 A1 | 8/2017 | Marinkovich |
| 2017/0270348 A1 | 9/2017 | Morgana et al. |
| 2017/0270349 A1 | 9/2017 | Polania Cabrera et al. |
| 2017/0270350 A1 | 9/2017 | Maltz et al. |
| 2017/0270593 A1 | 9/2017 | Sherman |
| 2017/0270691 A1 | 9/2017 | Maltz et al. |
| 2017/0272741 A1 | 9/2017 | Maltz et al. |
| 2017/0294010 A1* | 10/2017 | Shen ............... G06T 7/0002 |
| 2017/0308738 A1* | 10/2017 | Zhang ............... G06K 9/00288 |
| 2018/0276869 A1 | 9/2018 | Matts |
| 2018/0276883 A1 | 9/2018 | D'alessandro |
| 2018/0350071 A1 | 12/2018 | Purwar |

FOREIGN PATENT DOCUMENTS

| | | |
|---|---|---|
| CN | 104504376 A | 4/2015 |
| EP | 1297781 A1 | 4/2003 |
| EP | 1030267 B1 | 1/2010 |

(56) References Cited

FOREIGN PATENT DOCUMENTS

| | | |
|---|---|---|
| EP | 1813189 B1 | 3/2010 |
| EP | 1189536 B1 | 3/2011 |
| EP | 2728511 A1 | 5/2014 |
| GB | 2424332 A | 9/2006 |
| JP | 2007050158 A | 3/2007 |
| KR | 20140078459 A | 6/2014 |
| WO | WO200076398 A1 | 12/2000 |
| WO | 2003049039 A1 | 6/2003 |
| WO | 2006005917 A1 | 1/2006 |
| WO | 2007044815 A2 | 4/2007 |
| WO | WO2007051299 A1 | 5/2007 |
| WO | WO2008003146 A2 | 1/2008 |
| WO | WO2008086311 A2 | 7/2008 |
| WO | WO2009100494 A1 | 8/2009 |
| WO | WO2011109168 A1 | 9/2011 |
| WO | 2011146321 A2 | 11/2011 |
| WO | 2013104015 A1 | 7/2013 |
| WO | 2014122253 A2 | 8/2014 |
| WO | WO2015017687 A2 | 2/2015 |
| WO | WO201588079 A1 | 6/2015 |
| WO | WO2017029488 A2 | 2/2017 |

OTHER PUBLICATIONS

B. Tiddeman, M. Burt, and D. Perrett, "Prototyping and transforming facial textures for perception research," Computer Graphics and Applications, IEEE, vol. 21, No. 5, pp. 42-50, 2001.

D. M. Burt and D. I. Perrett, "Perception of age in adult Caucasian male faces: Computer graphic manipulation of shape and colour information," Proceedings of the Royal Society of London. Series B: Biological Sciences, vol. 259, No. 1355, pp. 137-143, 1995.

A. Lanitis, C. J. Taylor, and T. F. Cootes, "Toward automatic simulation of aging effects on face images," IEEE Transactions on Pattern Analysis and Machine Intelligence, vol. 24, No. 4, pp. 442-455, Apr. 2002.

Z. Liu, Z. Zhang, and Y. Shan, "Image-based surface detail transfer," Computer Graphics and Applications, IEEE, vol. 24, No. 3, pp. 30-35, 2004.

E. Patterson, K. Ricanek, M. Albert, and E. Boone, "Automatic representation of adult aging in facial images," in Proc. IASTED Int'l Conf. Visualization, Imaging, and Image Processing, 2006, pp. 171-176.

T. J. Hutton, B. F. Buxton, P. Hammond, and H. W. Potts, "Estimating average growth trajectories in shape-space using kernel smoothing," Medical Imaging, IEEE Transactions on, vol. 22, No. 6, pp. 747-753, 2003.

D. Dean, M. G. Hans, F. L. Bookstein, and K. Subramanyan, "Three-dimensional Bolton-Brush Growth Study landmark data: ontogeny and sexual dimorphism of the Bolton standards cohort," 2009.

J. H. Langlois and L. A. Roggman, "Attractive faces are only average," Psychological science, vol. 1, No. 2, pp. 115-121, 1990.

Y. H. Kwon and N. da Vitoria Lobo, "Age classification from facial images," in Computer Vision and Pattern Recognition, 1994. Proceedings CVPR'94., 1994 IEEE Computer Society Conference on, 1994, pp. 762-767.

P.A. George and G. J. Hole, "Factors influencing the accuracy of age estimates of unfamiliar faces," Perception—London—, vol. 24, pp. 1059-1059, 1995.

I. Pitanguy, F. Leta, D. Pamplona, and H. I. Weber, "Defining and measuring aging parameters," Applied Mathematics and Computation, vol. 78, No. 2-3, pp. 217-227, Sep. 1996.

Y. Wu, P. Kalra, and N. M. Thalmann, "Simulation of static and dynamic wrinkles of skin," in Computer Animation'96. Proceedings, 1996, pp. 90-97.

P. N. Belhumeur, J. P. Hespanha, and D. Kriegman, "Eigenfaces vs. fisherfaces: Recognition using class specific linear projection," Pattern Analysis and Machine Intelligence, IEEE Transactions on, vol. 19, No. 7, pp. 711-720, 1997.

M. J. Jones and T. Poggio, "Multidimensional morphable models," in Computer Vision, 1998. Sixth International Conference on, 1998, pp. 683-688.

I. Pitanguy, D. Pamplona, H. I. Weber, F. Leta, F. Salgado, and H. N. Radwanski, "Numerical modeling of facial aging," Plastic and reconstructive surgery, vol. 102, No. 1, pp. 200-204, 1998.

V. Blanz and T. Vetter, "A morphable model for the synthesis of 3D faces," in Proceedings of the 26th annual conference on Computer graphics and interactive techniques, 1999, pp. 187-194.

L. Boissieux, G. Kiss, N. M. Thalmann, and P. Kalra, Simulation of skin aging and wrinkles with cosmetics insight. Springer, 2000.

T. F. Cootes, G. J. Edwards, and C. J. Taylor, "Active appearance models," IEEE Transactions on pattern analysis and machine intelligence, vol. 23, No. 6, pp. 681-685, 2001.

Y. Bando, T. Kuratate, and T. Nishita, "A simple method for modeling wrinkles on human skin," in Computer Graphics and Applications, 2002. Proceedings. 10th Pacific Conference on, 2002, pp. 166-175.

M. R. Gandhi, "A method for automatic synthesis of aged human facial images," McGill University, 2004.

A. Lanitis, C. Draganova, and C. Christodoulou, "Comparing different classifiers for automatic age estimation," Systems, Man, and Cybernetics, Part B: Cybernetics, IEEE Transactions on, vol. 34, No. 1, pp. 621-628, 2004.

S. R. Coleman and R. Grover, "The anatomy of the aging face: volume loss and changes in 3-dimensional topography," Aesthetic surgery journal, vol. 26, No. 1 suppl, pp. S4-S9, 2006.

Y. Fu and N. Zheng, "M-face: An appearance-based photorealistic model for multiple facial attributes rendering," Circuits and Systems for Video Technology, IEEE Transactions on, vol. 16, No. 7, pp. 830-842, 2006.

X. Geng, Z.-H. Zhou, Y. Zhang, G. Li, and H. Dai, "Learning from facial aging patterns for automatic age estimation," in Proceedings of the 14th annual ACM international conference on Multimedia, 2006, pp. 307-316.

N. Ramanathan and R. Chellappa, "Modeling age progression in young faces," in Computer Vision and Pattern Recognition, 2006 IEEE Computer Society Conference on, 2006, vol. 1, pp. 387-394.

C. J. Solomon, S. J. Gibson, and others, "A person-specific, rigorous aging model of the human face," Pattern Recognition Letters, vol. 27, No. 15, pp. 1776-1787, 2006.

K. Ueki, T. Hayashida, and T. Kobayashi, "Subspace-based age-group classification using facial images under various lighting conditions," in Automatic Face and Gesture Recognition, 2006. FGR 2006. 7th International Conference on, 2006, p. 6-pp.

A. M. Albert, K. Ricanek Jr, and E. Patterson, "A review of the literature on the aging adult skull and face: Implications for forensic science research and applications," Forensic Science International, vol. 172, No. 1, pp. 1-9, 2007.

X. Geng, Z.-H. Zhou, and K. Smith-Miles, "Automatic age estimation based on facial aging patterns," Pattern Analysis and Machine Intelligence, IEEE Transactions on, vol. 29, No. 12, pp. 2234-2240, 2007.

K. Scherbaum, M. Sunkel, H.-P. Seidel, and V. Blanz, "Prediction of Individual Non-Linear Aging Trajectories of Faces," in Computer Graphics Forum, 2007, vol. 26, pp. 285-294.

J. Suo, F. Min, S. Zhu, S. Shan, and X. Chen, "A multi-resolution dynamic model for face aging simulation," in Computer Vision and Pattern Recognition, 2007. CVPR'07. IEEE Conference on, 2007, pp. 1-8.

Y. Fu and T. S. Huang, "Human age estimation with regression on discriminative aging manifold," Multimedia, IEEE Transactions on, vol. 10, No. 4, pp. 578-584, 2008.

G. Guo, Y. Fu, C. R. Dyer, and T. S. Huang, "Image-based human age estimation by manifold learning and locally adjusted robust regression," Image Processing, IEEE Transactions on, vol. 17, No. 7, pp. 1178-1188, 2008.

F. Jiang and Y. Wang, "Facial aging simulation based on super-resolution in tensor space," in Image Processing, 2008. ICIP 2008. 15th IEEE International Conference on, 2008, pp. 1648-1651.

(56) References Cited

OTHER PUBLICATIONS

U. Park, Y. Tong, and A. K. Jain, "Face recognition with temporal invariance: A 3d aging model," in Automatic Face & Gesture Recognition, 2008. FG'08. 8th IEEE International Conference on, 2008, pp. 1-7.
N. Ramanathan and R. Chellappa, "Modeling shape and textural variations in aging faces," in Automatic Face & Gesture Recognition, 2008. FG'08. 8th IEEE International Conference on, 2008, pp. 1-8.
B. Guyuron, D. J. Rowe, A. B. Weinfeld, Y. Eshraghi, A. Fathi, and S. Iamphongsai, "Factors contributing to the facial aging of identical twins," Plastic and reconstructive surgery, vol. 123, No. 4, pp. 1321-1331, 2009.
G. Mu, G. Guo, Y. Fu, and T. S. Huang, "Human age estimation using bio-inspired features," in Computer Vision and Pattern Recognition, 2009. CVPR 2009. IEEE Conference on, 2009, pp. 112-119.
N. Ramanathan, R. Chellappa, and S. Biswas, "Computational methods for modeling facial aging: A survey," Journal of Visual Languages & Computing, vol. 20, No. 3, pp. 131-144, 2009.
U. Park, Y. Tong, and A. K. Jain, "Age-invariant face recognition," Pattern Analysis and Machine Intelligence, IEEE Transactions on, vol. 32, No. 5, pp. 947-954, 2010.
J. Suo, S.-C. Zhu, S. Shan, and X. Chen, "A compositional and dynamic model for face aging," Pattern Analysis and Machine Intelligence, IEEE Transactions on, vol. 32, No. 3, pp. 385-401, 2010.
K. Sveikata, I. Balciuniene, and J. Tutkuviene, "Factors influencing face aging. Literature review," Stomatologija, vol. 13, No. 4, pp. 113-115, 2011.
J. P. Farkas, J. E. Pessa, B. Hubbard, and R. J. Rohrich, "The science and theory behind facial aging," Plastic and Reconstructive Surgery—Global Open, vol. 1, No. 1, pp. e8-e15, 2013.
J. Gatherwright, M. T. Liu, B. Amirlak, C. Gliniak, A. Totonchi, and B. Guyuron, "The Contribution of Endogenous and Exogenous Factors to Male Alopecia: A Study of Identical Twins," Plastic and reconstructive surgery, vol. 131, No. 5, p. 794e-801e, 2013.
F. Durand and B. Freeman, "14: Image Warping and Morphing," presented at the 6.882 Advanced Computational Photography, MIT.
U.S. Appl. No. 62/547,196, filed Aug. 18, 2017, Ankur (NMN) Purwar.
All Office Actions, U.S. Appl. No. 15/414,002.
All Office Actions, U.S. Appl. No. 15/414,095.
All Office Actions, U.S. Appl. No. 15/414,147.
All Office Actions, U.S. Appl. No. 15/414,189.
All Office Actions, U.S. Appl. No. 15/414,305.
All Office Actions, U.S. Appl. No. 15/465,166.
All Office Actions, U.S. Appl. No. 15/993,950.
All Office Actions, U.S. Appl. No. 15/993,973.
Andreas Lanitis, Comparative Evaluation of Automatic Age-Progression Methodologies, EURASIP Journal on Advances in Signal Processing, vol. 2008, No. 1, Jan. 1, 2008, 10 pages.
Beauty.AI Press Release, PRWeb Online Visibility from Vocus, Nov. 19, 2015, 3 pages.
Chen et al., Face Image Quality Assessment Based on Learning to Rank, IEEE Signal Processing Letters, vol. 22, No. 1 (2015), pp. 90-94.
Crete et al., The blur effect: perception and estimation with a new no-reference perceptual blur metric, Proc. SPIE 6492, Human Vision and Electronic Imaging XII, 2007, 12 pages.
Dong et al., Automatic age estimation based on deep learning algorithm, Neurocomputing 187 (2016), pp. 4-10.
Finlayson et al., Color by Correlation: A Simple, Unifying Framework for Color Constancy, IEEE Transactions on Pattern Analysis and Machine Intelligence, vol. 23, No. 11, Nov. 2001, pp. 1209-1221.
Fu et al., Learning Race from Face: A Survey, IEEE Transactions on Pattern Analysis and Machine Intelligence, vol. 36, No. 12, Dec. 1, 2014, pp. 2483-2509.
Gong et al., Quantification of Pigmentation in Human Skin Images, IEEE, 2012, pp. 2853-2856.
Gray et al., Predicting Facial Beauty without Landmarks, European Conference on Computer Vision, Computer Vision—ECCV 2010, 14 pages.
Guodong Guo et al., A framework for joint estimation of age, gender and ethnicity on a large database, Image and Vision Computing, vol. 32, No. 10, May 10, 2014, pp. 761-770.
Huerta et al., A deep analysis on age estimation, Pattern Recognition Letters 68 (2015), pp. 239-249.
Hyvarinen et al., A Fast Fixed-Point Algorithm for Independent Component Analysis of Complex Valued Signals, Neural Networks Research Centre, Helsinki University of Technology, Jan. 2000, 15 pages.
Hyvarinen et al., A Fast Fixed-Point Algorithm for Independent Component Analysis, Neural Computation, 9:1483-1492, 1997.
International Search Report and Written Opinion of the International Searching Authority, PCT/US2017/023334, dated May 15, 2017, 12 pages.
International Search Report and Written Opinion of the International Searching Authority, PCT/US2018/023042, dated Jun. 6, 2018.
International Search Report and Written Opinion of the International Searching Authority, PCT/US2018/023219, dated Jun. 1, 2018, 13 pages.
International Search Report and Written Opinion of the International Searching Authority, PCT/US2018/035291, dated Aug. 30, 2018, 11 pages.
International Search Report and Written Opinion of the International Searching Authority, PCT/US2018/035296, dated Oct. 17, 2018, 17 pages.
Jagtap et al., Human Age Classification Using Facial Skin Aging Features and Artificial Neural Network, Cognitive Systems Research vol. 40 (2016), pp. 116-128.
Konig et al., A New Context: Screen to Face Distance, 8th International Symposium on Medical Information and Communication Technology (ISMICT), IEEE, Apr. 2, 2014, pp. 1-5.
Krizhevsky et al., ImageNet Classification with Deep Convolutional Neural Networks, part of Advances in Neural Information Processing Systems 25 (NIPS 2012), 9 pages.
Levi et al., Age and Gender Classification Using Convolutional Neural Networks, IEEE Conference on Computer Vision and Pattern Recognition (CVPR) Workshops, 2015, pp. 34-42.
Mathias et al., Face Detection Without Bells and Whistles, European Conference on Computer Vision, 2014, pp. 720-735.
Ojima et al., Application of Image-Based Skin Chromophore Analysis to Cosmetics, Journal of Imaging Science and Technology, vol. 48, No. 3, May 2004, pp. 222-226.
Sun et al., Statistical Characterization of Face Spectral Reflectances and Its Application to Human Portraiture Spectral Estimation, Journal of Imaging Science and Technology, vol. 46, No. 6, 2002, pp. 498-506.
Sung Eun Choi et al., Age face simulation using aging functions on global and local features with residual images, Expert Systems with Applications, vol. 80, Mar. 7, 2017, pp. 107-125.
Tsumura et al., Image-based skin color and texture analysis/synthesis by extracting hemoglobin and melanin information in the skin, ACM Transactions on Graphics (TOG), vol. 22, Issue 3, Jul. 2003, pp. 770-779.
Viola et al., Robust Real-Time Face Detection, International Journal of Computer Vision 57(2), 2004, pp. 137-154.
Wang et al., Combining Tensor Space Analysis and Active Appearance Models for Aging Effect Simulation on Face Images, IEEE Transactions on Systems, Man, and Cybernetics—Part B: Cybernetics, vol. 42, No. 4, Aug. 1, 2012, pp. 1107-1118.
Wang et al., Deeply-Learned Feature for Age Estimation, 2015 IEEE Winter Conference on Applications of Computer Vision, pp. 534-541.
Wu et al., Funnel-Structured Cascade for Multi-View Face Detection with Alignment-Awareness, Neurocomputing 221 (2017), pp. 138-145.
Xiangbo Shu et al., Age progression: Current technologies and applications, Neurocomputing, vol. 208, Oct. 1, 2016, pp. 249-261.

(56) References Cited

OTHER PUBLICATIONS

Yi et al., Age Estimation by Multi-scale Convolutional Network, Computer Vision—ACCV 2014, Nov. 1, 2014, pp. 144-158, 2015.
Yun Fu et al., Age Synthesis and Estimation via Faces: A Survey, IEEE Transactions on Pattern Analysis and Machine Intelligence, vol. 32, No. 11, Nov. 1, 2010, pp. 1955-1976.

* cited by examiner

SYSTEM AND METHOD FOR GUIDING A USER TO TAKE A SELFIE

FIELD

The present application relates generally to systems and methods for improving the quality of a self-captured digital photograph. More specifically, the present application relates to a system of image processing modules that utilize qualitative metrics to process the image and determine the quality of a self-captured digital image, especially an image of a person's face. Depending on the image quality, a variety of additional image processing and/or analysis steps may be implemented or the user may be prompted to retake the selfie.

BACKGROUND

Digital imaging technology permeates modern society. Biometric scanning, computer-generated imagery, photo-shopping, and so-called "selfies" are just a few ubiquitous examples of digital imaging applications. Recently, it has been recognized that using digital imaging technology, especially images or selfies of consumers, can be useful for identifying new customers and/or marketing products to consumers. For example, some beauty care and cosmetics companies use consumer selfies to provide skin profiles to consumers and/or provide customized product and regimen recommendations. However, the increasing complexity of modern computer models, which are used to analyze these images, make it more important than ever to ensure that the image to be analyzed meets a minimum threshold of quality so that the computer model can provide a more accurate analysis.

Past attempts to improve the quality of a selfie have used various metrics and techniques to help a user capture a higher quality image, including, for example, the use of a so-called "wire frame" in which an outline or silhouette of a person's face appears on the screen of the image capture device (e.g., smart phone or digital camera display). When the wire frame appears, a user aligns their face with the wire frame and then takes a selfie. While the wire frame approach may help with positioning the face properly, it does not address the variety of other factors that can influence the quality of selfie (e.g., lighting, shadowing, occlusion, facial expressions, blur). Accordingly, there is a need to provide an image analysis system that can help a user conveniently address more, and ideally all, of the factors that significantly affect the image quality of a selfie, thereby enabling the user to provide a higher quality selfie to an image analysis system.

Other past attempts to improve selfie quality have addressed various individual factors that affect selfie quality, but none have looked at these factors collectively to provide an overall indication of selfie quality in a consumer friendly way. Thus, there still remains a need to provide a system that combines various image quality factors into a single, convenient score, which can be used to determine whether the selfie quality is sufficient for use by image analysis software.

SUMMARY

Disclosed herein is a computer-implemented method for guiding a consumer to take a selfie. The method comprises capturing a selfie with a digital image capture device and analyzing the selfie to determine if there is a face present in the selfie and at least one landmark facial feature present on the face. If a face and at least one facial landmark are detected, then the face is normalized. After the selfie is analyzed and normalized, it undergoes further analysis to determine an image quality metric selected from occlusion, blur, distance-to-camera, facial expression, illumination, and combinations of these. An SQI score is generated from the analyzed image quality metric(s), and the SQI score is used to determine whether the selfie will undergo further analysis. The results of the quality metric analysis and SQI can be provided to a user as guidance for improving the quality of their selfie.

Also disclosed herein is a system for guiding a consumer to take a selfie. The system comprises an image capture device; a computing device coupled to the image capture device, the computing device comprising a non-transitory memory component that stores logic, wherein the logic comprises: an image processing module that causes the computing device to analyze the selfie to determine if there is a face present and if there is at least one landmark facial feature present on the face, and normalize the selfie if the face and at least one landmark facial feature are determined to be present, a selfie quality index (SQI) module that causes the computing device to analyze the normalized selfie for a quality metric selected from occlusion, blur, distance-to-camera, facial expression, illumination, and combinations of these, wherein the system generates an SQI score based on the analyzed image quality metric and the SQI score; and a display device coupled to at least one of the image capture device and the computing device, wherein the display device is configured to display output from the system to a user.

DETAILED DESCRIPTION

Figure 1:
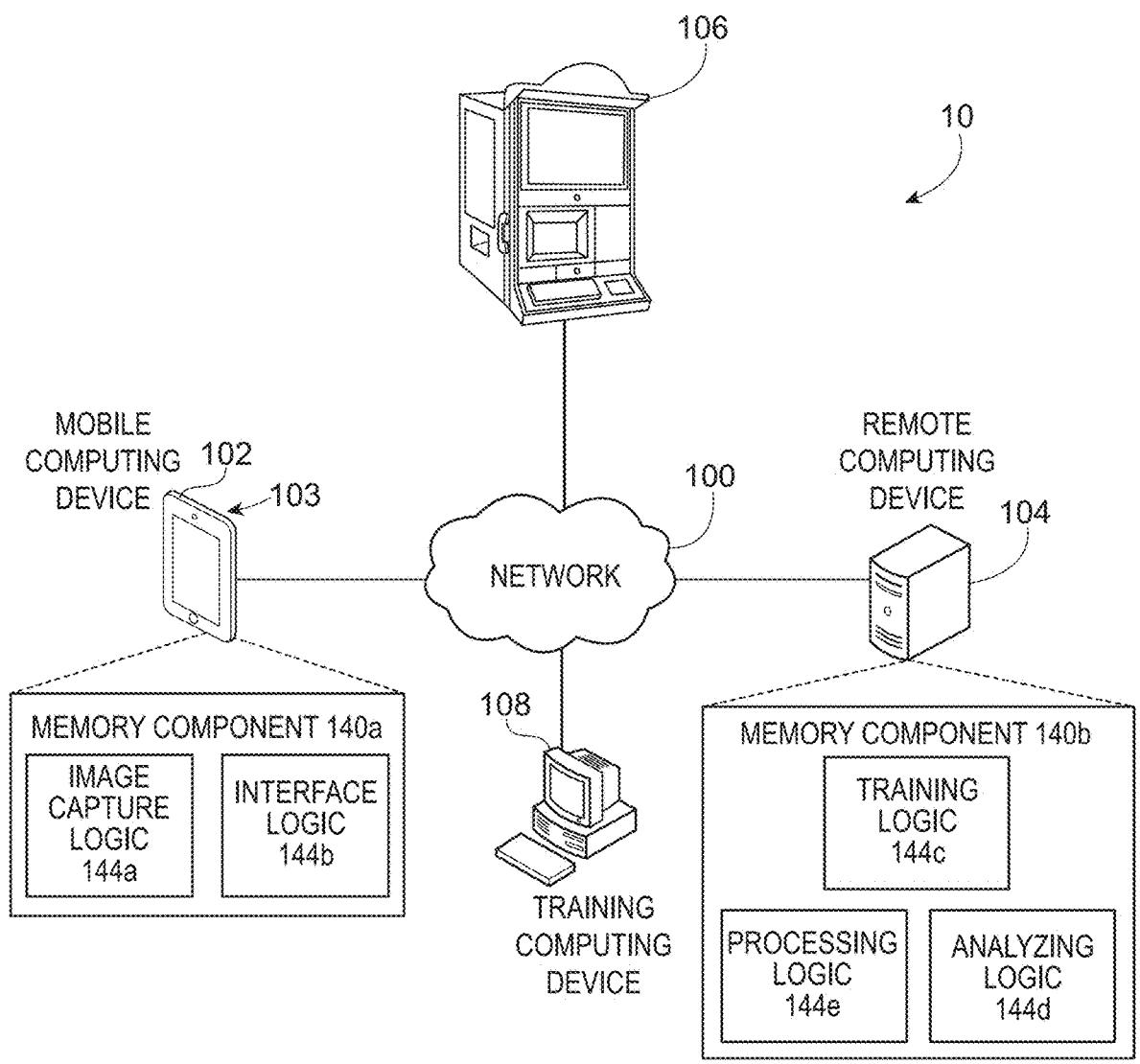
FIG. 1 depicts an example of the present system.

A variety of image analysis systems and methods have been used in the cosmetics industry to provide consumer with skin profiles, skin age predictions, customized skin care product recommendations, and skin care regimens. It is not uncommon for most, if not all, of the images used by conventional skin models/skin analysis systems to be selfies, since selfies are one of the most common types of photographs taken in recent times. However, analyzing selfies can be problematic due to a wide variation in image quality related to camera quality, lighting, user skill, distance from the camera, etc. Image quality can directly impact the accuracy of the skin analysis predictions/results provided by a conventional image analysis system. Thus, lower image quality can result in a less accurate age prediction, skin condition profile, product recommendation, and/or regimen recommendation. Conversely, higher quality selfies typically result in better image analysis results.

Some conventional skin analysis systems attempt to improve selfie image quality by using one of several known methods, such as, for example, so-called wire frames, which help produce a selfie with more consistent distance or angle. However, conventional image analysis systems and methods do not use a comprehensive indication of image quality based on multiple factors that can impact image quality, such as, for example, cropping/bordering, filtering, normalizing contrast/color.

The present system and methods address the problem of low quality images by utilizing a novel selfie quality index and user feedback system to help a user take a higher quality selfie image. When used by a suitable skin analysis system, the higher quality image can improve the accuracy of skin age predictions, skin condition profiles, skin care product recommendations, and/or skin care regimen recommendations. Ideally, the present system and methods can help a user capture a "passport quality" selfie, which is a standard of excellence by some in the image analysis field.

Definitions

"About," as used herein, modifies a value, by referring to a range equal to the value plus or minus twenty percent (+/−20%) or less (e.g., less than 15%, 10%, or even less than 5%).

"Convolutional neural network" is a type of feed-forward artificial neural network where the individual neurons are tiled in such a way that they respond to overlapping regions in a visual field.

"Coupled," when referring to various components of the system herein, means that the components are in electrical, electronic, and/or mechanical communication with one another.

"Disposed" means an element is positioned in a particular place relative to another element.

"Feature vector" means a series of features that contain information describing one or more characteristics of an object in a digital image. Each feature in the feature vector is typically represented by one or more numbers, but any suitable indicator may be used, as desired (letters, symbols, colors, etc.)

"Image capture device" means a device such as a digital camera or film-using camera that is capable of capturing/recording an image of a person.

"Joined" means configurations whereby an element is directly secured to another element by affixing the element directly to the other element, and configurations whereby an element is indirectly secured to another element by affixing the element to intermediate member(s) that in turn are affixed to the other element.

"Macro features" are relatively large bodily features found on or near the face of a human. Macro features include, without limitation, face shape, ears, eyes, mouth, nose, hair, and eyebrows.

"Micro features" are relatively small features commonly associated with aging skin and/or skin disorders found on the face of a human Micro features include, without limitation, fine line, wrinkles, dry skin features (e.g., skin flakes), and pigmentation disorders (e.g., hyperpigmentation conditions). Micro features do not include macro features.

"Masking" refers the process of digitally replacing at least some of the pixels disposed in and/or proximate to a macro feature in an image with pixels that have an RGB value closer to or the same as pixels disposed in a region of interest.

"Model" herein refers to a mathematical equation, algorithm, or computer software used to predict, describe, or imitate a set of circumstances, a system, or a naturally occurring phenomenon.

"Region of interest" or "RoI" means a specifically bounded portion of an image where analysis is desired. A nonlimiting example of a region of interest include a portion of an image inside a bounding box, which is described in more detail below. Other examples of RoI include depicting portions of skin disposed the forehead, cheek, nasolabial fold, under-eye area, or chin. In some instances, the RoI may be a portion of an image of a face in which one or more macro features have been masked.

"Selfie" refers to a digital photograph of a person taken by that person, another person, or an automated image capture system (e.g., photo booth or security camera). A selfie includes a face of a person along with associated background features in the captured image.

"User" herein refers to a person who uses at least the features provided herein, including, for example, a device user, a product user, a system user, and the like.

Image Analysis System

The image analysis system herein may be configured as a multi-step system in which a raw digital image is processed and/or analyzed by one or more image quality modules to ensure images of suitable quality are provided to, e.g., a trained convolutional neural network, for analysis of a skin condition. The image quality modules may be configured to process the image for qualitative analysis in a first step and then qualitatively analyze the processed image to measure one or more qualitative metrics related to selfie image quality in a second step. If the quality of the image satisfies a threshold level of quality, the image may then be further analyzed using a suitable skin model.

The metric(s) analyzed by a particular image quality module may the same as or different from the metric(s) analyzed by another module. Some nonlimiting examples of qualitative metrics that may be analyzed by the modules of the present system are face position, landmark detection, masking, number of faces present in the image, distance from the camera, face ratio, occlusion, facial expression, blur, and illumination (direction, location, intensity, and/or contrast). The results of the analyses from the image quality modules may then be used to generate a selfie quality index ("SQI") score that reflects the quality of the selfie.

In some instances, the system may display the progress of the analysis to a user via a display on the mobile computing device or a separate display device (e.g., computer monitor). For example, the display may simulate the progress of the analysis by showing a sequence of qualitative image metrics (e.g., distances to camera, blur, lighting, occlusion, expression) accompanied by an indication to the user that the system is performing the analysis. In some instances, the selfie may even be modified to correspond with the sequence of metric analyses. For example, the system may indicate to a user that the selfie is being analyzed for blurriness, and the selfie may appear to become blurry and then come back into focus. Next, the system may indicate to a user that the selfie is being analyzed for proper lighting while varying the contrast or brightness of the image. Once the analysis is complete, the system may display an SQI score and/or any issues detected by the various modules that may affect selfie quality. Depending on the selfie quality score, the user may then be offered the option of submitting the selfie for further analysis or retaking the selfie.

In some instances, if the SQI score satisfies a predetermined threshold value, then it is analyzed using a suitable skin model. On the other hand, if the SQI score does not satisfy the predetermined threshold value, then the system may prompt the user (e.g., via a visual or audio cue) that the selfie was unsatisfactory and/or prevent the image from undergoing further analysis. Depending on the scoring scale being used, the threshold value may be a minimum threshold value or a maximum threshold value. Additionally or alternatively, the system may provide information to a user regarding the reason why the selfie was unsatisfactory, for example, by communicating which metrics were unsatisfactory and/or how to improve an unsatisfactory metric.

FIG. 1 depicts an exemplary skin analysis system 10 for capturing and analyzing an image of a person. The system 10 exemplified in FIG. 1 includes a network 100 (e.g., a wide area network such as a mobile telephone network, a public switched telephone network, a satellite network, and/or the internet; a local area network such as wireless-fidelity, Wi-Max, ZigBee™, and/or Bluetooth™; and/or other suitable forms of networking capabilities). Coupled to the network 100 are a mobile computing device 102, a remote computing device 104, and a training computing device 108.

The mobile computing device 102 may be a mobile telephone, a tablet, a laptop, a personal digital assistant and/or other computing device configured for capturing, storing, and/or transferring an image such as a digital photograph. Accordingly, the mobile computing device 102 may include an image capture device 103 such as a digital camera and/or may be configured to receive images from other devices. The mobile computing device 102 may include a non-transitory memory component 140a, which stores image capture logic 144a and interface logic 144b. The non-transitory memory component 140a may include random access memory (such as SRAM, DRAM, etc.), read only memory (ROM), registers, and/or other forms of computing storage hardware. The image capture logic 144a and the interface logic 144b may include software components, hardware circuitry, firmware, and/or other computing infrastructure. The image capture logic 144a may facilitate capturing, storing, preprocessing, analyzing, transferring, and/or performing other functions on a digital image of a user. In some instances, the image capture logic 144a may include some, all, or none of the smart selfie modules described herein, e.g., in the form of a smart phone "app". The interface logic 144b may be configured to provide one or more user interfaces to the user, which may include questions, options, and the like. The mobile computing device 102 may also be configured for communicating with other computing devices via the network 100.

The remote computing device 104 may also be coupled to the network 100 and may be configured as a server (or plurality of servers), personal computer, mobile computer, and/or other computing device configured for creating, storing, and/or training a convolutional neural network capable of determining the skin age of a user by locating and analyzing skin features that contribute to skin age in a captured image of the user's face. For example, the CNN may be stored as logic 144c and 144d in the non-transitory memory component 140b of a remote computing device 104. Commonly perceived skin flaws such as fine lines, wrinkles, dark (age) spots, uneven skin tone, blotchiness, enlarged pores, redness, yellowness, combinations of these and the like may all be identified by the trained CNN as contributing to the skin age of the user.

The remote computing device 104 may include a non-transitory memory component 140b that stores training logic 144c, analyzing logic 144d, and/or processing logic 144e. The non-transitory memory component 140b may include random access memory (such as SRAM, DRAM, etc.), read only memory (ROM), registers, and/or other forms of computing storage hardware. The training logic 144c, analyzing logic 144d, and/or processing logic 144e may include software components, hardware circuitry, firmware, and/or other computing infrastructure. Training logic 144c facilitates creation and/or training of the CNN, and thus may facilitate creation of and/or operation of the CNN. Processing logic 144e causes the image received from the mobile computing device 102 (or other computing device) to be processed for analysis by the analyzing logic 144d. In some instances, the processing logic 144e may include some, all, or none of the image quality analysis modules described herein. Image processing may include macro feature identification, masking, segmentation, and/or other image alteration processes, which are described in more detail below. The analyzing logic 144d includes at least one skin model (e.g., in the form of one or more CNNs) for analyzing the processed image to provide an apparent skin age, skin condition diagnosis, product recommendation, etc.

In some instances, a training computing device 108 may be coupled to the network 100 to facilitate training of the CNN. For example, a trainer may provide one or more digital images of a face or skin to the CNN via the training computing device 108. The trainer may also provide information and other instructions (e.g., actual age) to inform the CNN which assessments are correct and which assessments are not correct. Based on the input from the trainer, the CNN may automatically adapt, as described in more detail below.

The system 10 may also include a kiosk computing device 106, which may operate like the mobile computing device 102, but may also be able to dispense one or more products and/or receive payment in the form of cash or electronic transactions. Of course, it is to be appreciated that a mobile computing device 102, which also provides payment and/or production dispensing, is contemplated herein. In some instances, the kiosk computing device 106 and/or mobile computing device 102 may also be configured to facilitate training of the CNN. Thus, the hardware and software depicted and/or described for the mobile computing device 102 and the remote computing device 104 may be included in the kiosk computing device 106, the training computing device 108, and/or other devices.

It should also be understood that while the remote computing device 104 is depicted in FIG. 1 as performing the image processing and image analysis, this is merely an example. The image processing and/or image analysis may be performed by any suitable computing device, as desired.

Image Quality Modules and Selfie Quality Index Score

The image quality modules herein may include image processing modules and SQI modules. Once an image is captured by a suitable image capture device, which is coupled to the mobile and/or remote computing devices, the image processing module(s) may process the raw image for quality metric analysis by the SQI modules or classify the image as unsuitable for further analysis. The SQI modules may provide one or more feature vectors that correspond to various metrics of image quality (discussed in more detail below), which are then used to calculate the selfie quality index score. The feature vector output from each SQI module may contribute equally or disproportionately to the SQI score. For example, the output from one SQI module may be weighted to contribute more to the SQI score than one or more of the other SQI modules (e.g., 2×, 3×, 4×, 5×, 6×, or even 7× as much).

In the system and methods herein, the SQI score may be communicated to a user and/or used to determine subsequent steps in the image analysis process. The SQI score may be binary (e.g., 0 or 1, yes or no, pass or fail), scaled (e.g., a value on a scale of 1 to 10 or 1 to 100), and/or qualitative (e.g., poor, moderate, good, excellent). For example, in a binary scoring format, each SQI module may generate a quality metric score of 1 when the image meets a predetermined minimum quality standard or a quality metric score of 0 when the image does not meet the minimum quality standard. If there are 8 SQI modules in this example and all contribute equally to the SQI score, then the SQI score can range from 0 to 8. In an example of a scaled score format, a feature vector from each of 8 SQI modules may be provided as a value on a scale of 1 to 10, wherein 1 corresponds to the lowest quality metric for that particular feature vector. The scores from the SQI modules may be combined to provide an SQI score ranging from 8 to 80 and/or the combined scores may be averaged to provide an SQI score ranging from 1 to 10. Of course, it is to be appreciated that the SQI score may be calculated by any suitable method of combining the individual feature vectors of the SQI modules and/or presented in any format, as desired.

In some instances, the SQI score may be used generate feedback to the user for improving the quality of the selfie. For example, one or more feature vectors used to calculate the SQI score, which are described in more detail below, may be used by the system to provide guidance and/or prompts to a user (e.g., via the mobile computing device display) for improving selfie quality. In this example, the system may prompt the user to retake the selfie if the SQI score is below a minimum threshold value (e.g., below 6, 5, 4, or 3 on a scale of 1 to 10) or above a maximum threshold value (e.g., above 4, 5, 6, or 7 on a scale of 1 to 10, where 10 corresponds to lowest quality). In some instances, the system may prompt the user to retake the selfie, if one or more of the individual feature vectors are below a minimum acceptable threshold (e.g., blur is less than 3 or 2 on a scale of 1 to 10). In some instances, if the SQI score satisfies the threshold value, but is still less than a desired or ideal level of quality, then the user may be offered the choice to retake the selfie or have the selfie analyzed. In some instances, the SQI score may be used to classify the image into a quality category (e.g., poor, moderate, good, excellent), which can then be communicated to a user. In some instances, a user may be prompted to improve their SQI score, for example, by comparing the user's SQI score to a previous SQI score for that user or to an average SQI score for a population of users.

Image Processing Modules

The image quality modules may include one or more image processing modules. The image processing modules may be configured to locate and/or count faces in an image, extract different zones from a face in an image, register the face using one or more facial features as landmarks, and/or normalize the face to a common coordinate system. In some instances, the image processing modules may include a Face Detection and Counting module ("FDC module"), a Landmark Detection module ("LD module"), and/or a Face Registration module ("FR module").

In some instances, the first step of the image processing stage is for a Face Detection and Counting module to determine if there is a face present in the selfie image and/or how many faces are present. If a single face is detected by the FDC module, the FDC module may isolate the face from the rest of the image, for example, using a bounding box, and then pass the isolated face on to the Landmark Detection module. If multiple faces are detected, then the FDC module or the controlling application (i.e., the logic that coordinates certain interactions between the various modules and/or between the modules and other components of the system) may determine whether to continue processing the image. For example, the FDC module may select the largest face present in the image (e.g., based on total pixel area) and/or the face located closest to the center of the image, isolate the selected face, and pass the isolated face to the LD module. In some instances, if multiple faces are detected in an image, the FDC module may cause the system to communicate to the user that multiple faces were detected in the image and/or prompt the user to retake the selfie with only one face present in the image.

The FDC module may use any suitable face detection technique known in the art. Some non-limiting examples of face detection techniques that may be suitable for use herein include the "Bells and Whistle" technique, which is described by M. Mathias, et al., in "Face Detection Without Bells and Whistles" ECCV, 2014; the Seeta technique, which is described by Wu, et al., in "Funnel-Structured Cascade for Multi-View Face Detection with Alignment-Awareness," Neurocomputing, 2016; and the Viola-Jones technique, which is described by Paul Viola and Michael Jones, in "Robust Real-time Object Detection," IJCV, 2001.

Figure 2:
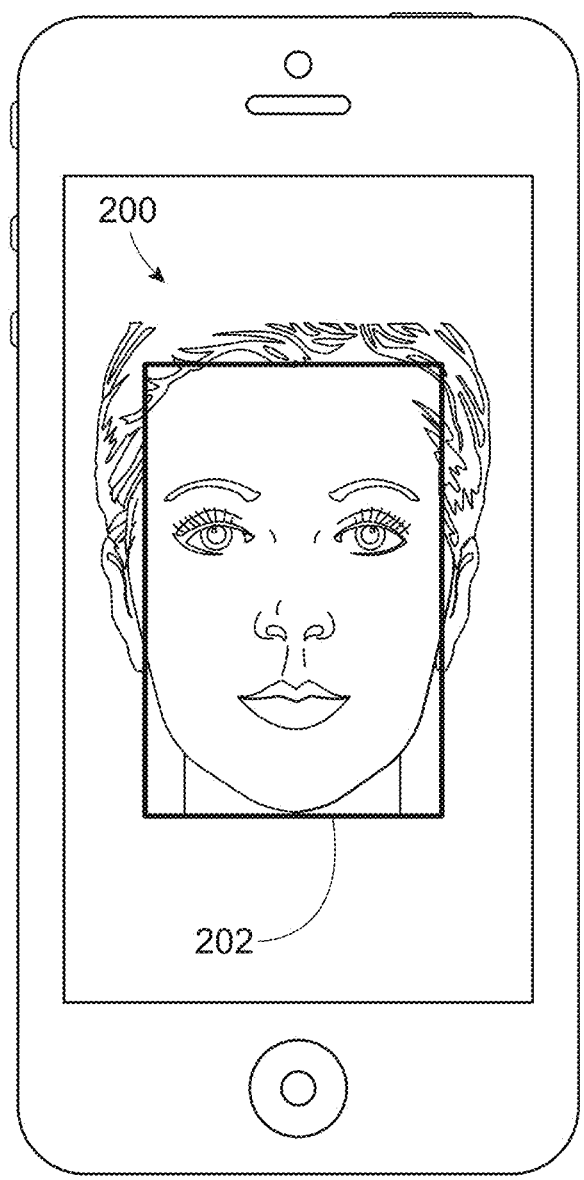
FIG. 2 illustrates the results of an analysis by the Face Counting and Detection module.

FIG. 2 is an exemplary illustration of a selfie 200 in a bounding box 202. The bounding box 202 isolates the portion of the image that contains the regions of interest (e.g., facial features such as the forehead, cheeks, eyes, chin, and mouth) from the rest of the image 200. The bounding box 202 may be sized to remove background objects, facial macro features or other body parts, and/or portions thereof (e.g., hair, ears, and shoulders). While the bounding box depicted in FIG. 2 is rectangular, it is to be appreciated that the bounding box may be any suitable shape, as desired. In some instances, the bounding box may be coextensive with the outline of the face.

Figure 3:
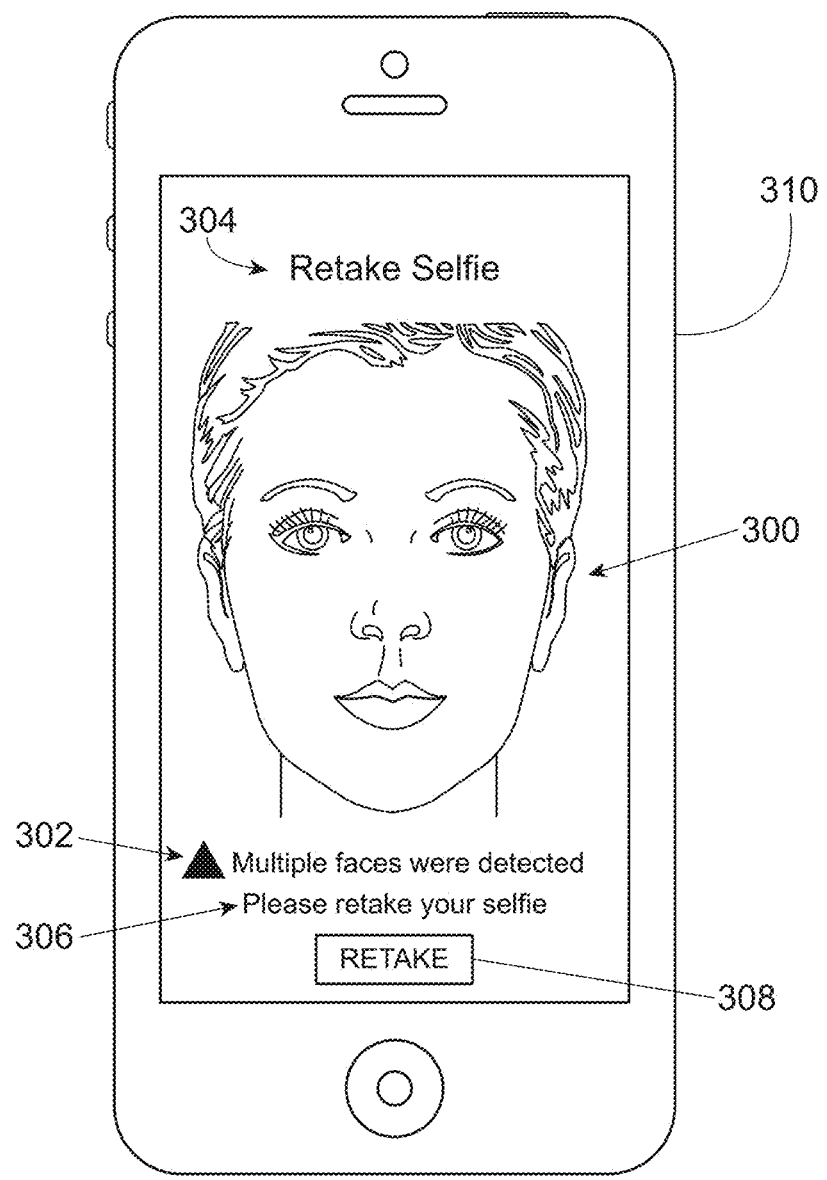
FIG. 3 illustrates the results of an analysis by the Face Counting and Detection module.

FIG. 3 illustrates an example in which the FDC module detects multiple faces in an image. In this example, the FDC module causes the system to provide an error message 302 to the user to indicate that multiple faces were detected. The system may also provide a verbal request to retake the selfie, as illustrated by the visual cues 304 and 306. The system may also provide a button 308 for the user to use to retake the selfie. In some instances, the FDC module may cause the system to display the image and/or one of the faces 300 detected in the image on the display on the mobile computing device 310.

Upon receiving the isolated image of the face from the FDC module, the Landmark Detection module analyzes the image of the face to identify (i.e., locate and/or analyze) various facial landmark points, at least some of which may be used by the Face Registration module to normalize the image. The landmark points identified on the face may be predetermined or selected by a facial landmark detection algorithm. Some nonlimiting examples of landmark detection algorithms that may be suitable for use in the present system include tasks-constrained deep convolutional networks ("TCDCN") and landmark detection software applications available from Dlib and The Menpo Project. In some instances, the LD module may cause the system to mask one or more facial macro features present in the image. If no facial landmarks are detected, the LD module may cause the system to refrain from any further analysis of the selfie and/or ask the user to retake the selfie.

Figure 4:
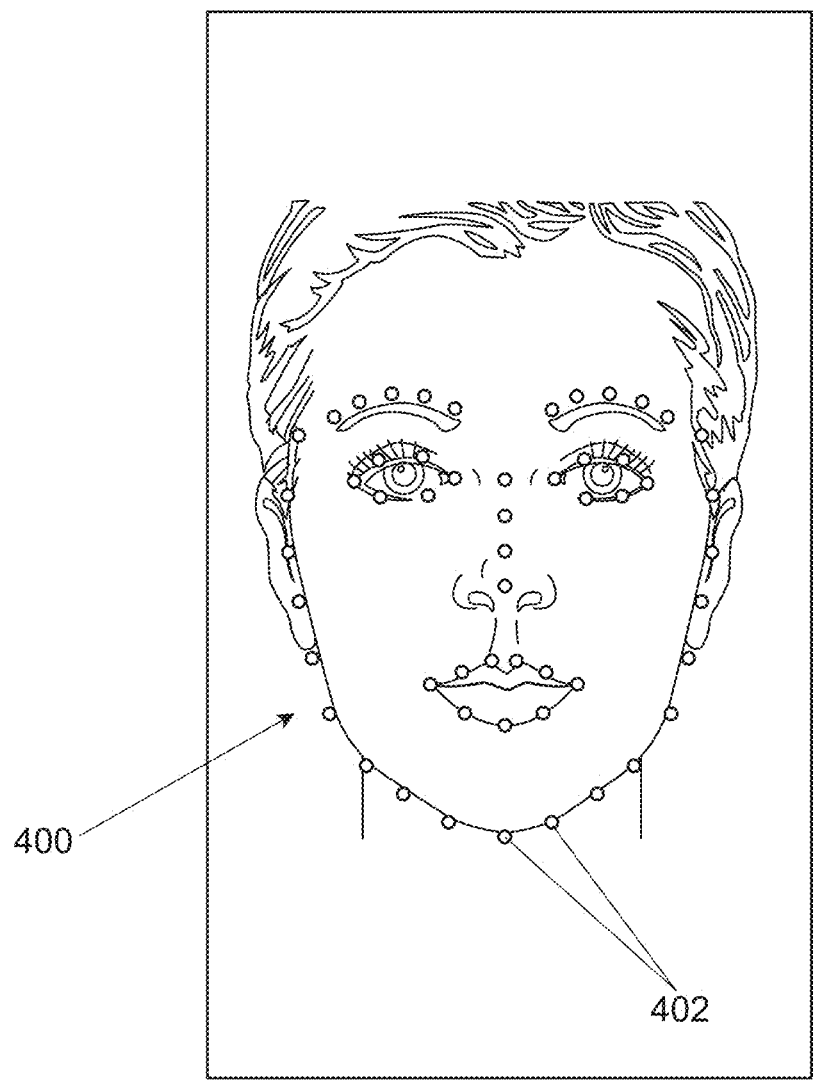
FIG. 4 illustrates the results of an analysis by the Face Counting and Detection module.

FIG. 4 illustrates an image of a face 400 that includes landmark points 402, which correspond to various macro features on the face 400 (e.g., eyes, eyebrows, nose, cheeks, chin, jaw, and hair). In the example illustrated in FIG. 4, sixty-eight landmark points are used to locate the eyes, the eyebrows, the nose, the mouth, and the circumference of the face. For example, each eyebrow may be locating using five points that extend along the length of the eyebrow. Each eye may be located using 6 points arranged with 2 points on each of the upper and lower eyelids and one point at each of the inner and outer corners of the eye. The nose may be located using four points that extend along the bridge of the nose to the end of the nose. The mouth may be located using 20 points arranged with 2 points at each corner of the mouth, 5 points at each of an upper portion of the upper lip and a lower portion of the lower lip, and 3 points at each of a lower portion of the upper lip and an upper portion of the lower lip. The outline or boundary of the face may be located using 17 points that extend from one temple (e.g., at the hairline) down the jaw line, around the chin, and up the opposite jaw line to the opposite temple (e.g., at the hairline). Of course, it is to be appreciated that any number of landmark points and/or facial features may be used, as desired.

After analysis by the Landmark Detection Module, the image and the identified landmark points are passed to the Face Registration Module, which helps solve the problem of image misalignment. It is also important to normalize and register the image to a common coordinate system to minimize variance across subjects when extracting features for the SQI modules. Thus, spatially sensitive features can be consistently extracted by the SQI modules across different images.

Figure 5A:
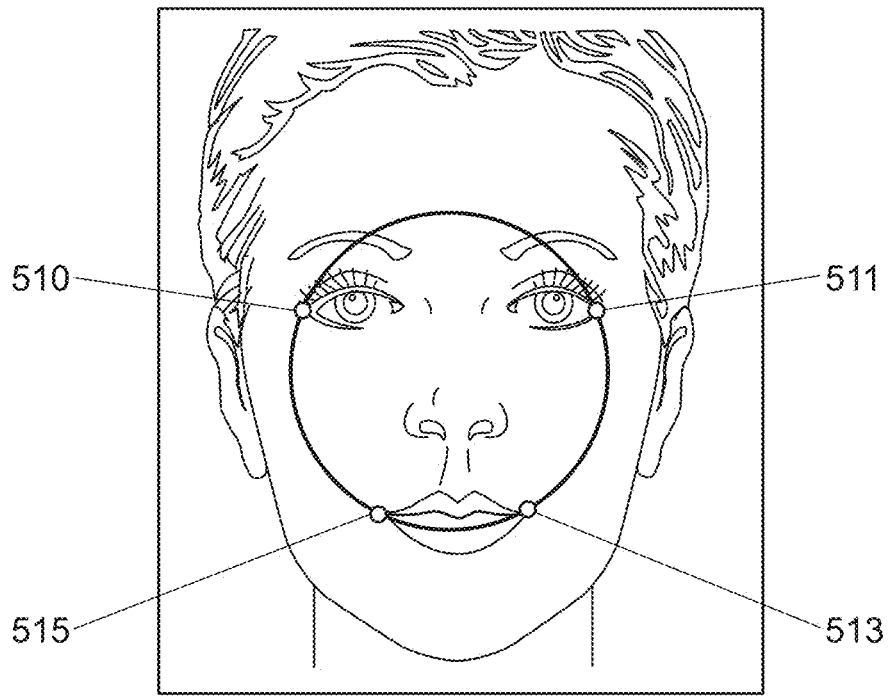
FIG. 5A to 5C illustrate the results of an analysis by the Face Registration module.
Figure 5B:
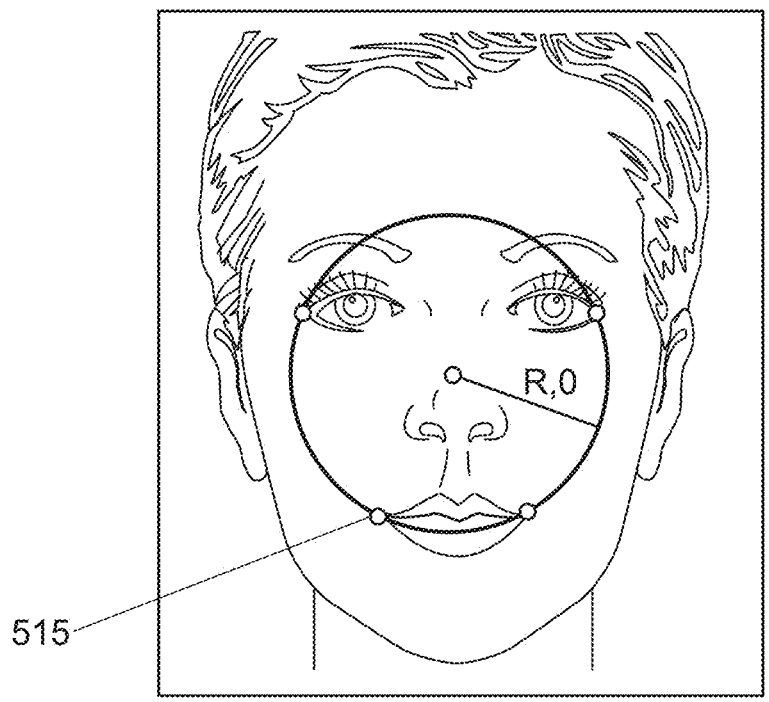

In some instances, as illustrated in FIG. 5A, four landmark points may be selected, which may include the outer corners of each eye 510 and 511 and the outer corners of the mouth 512 and 513. A circle 515 can be inscribed such that the perimeter of the circle intersects the four blue landmarks 510, 511, 512, and 513, as illustrated in FIG. 5B. The equation for the circle 515 can be defined as:

$$x^2+y^2+Ax+By+C=0$$

Figure 5C:
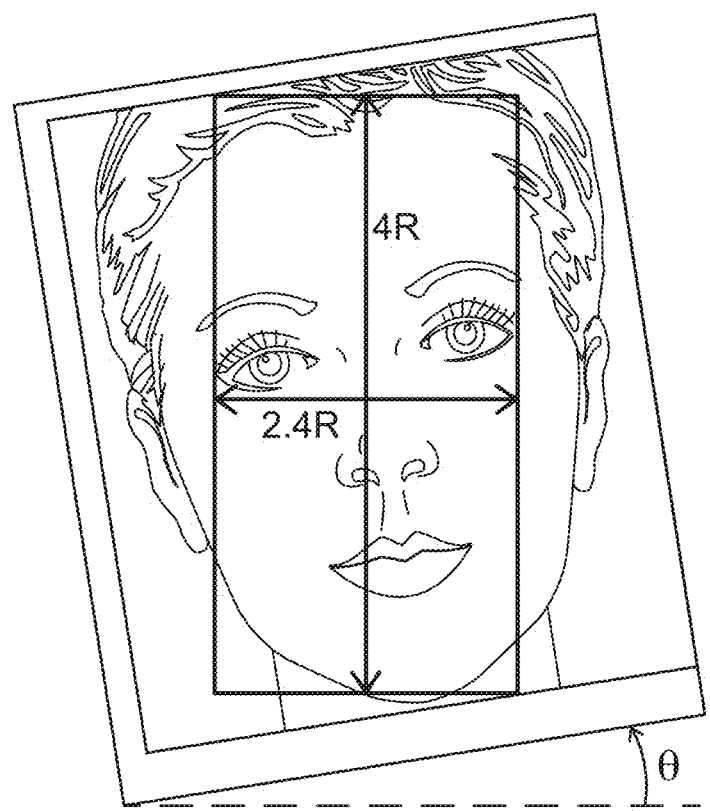

There are 3 unknowns (A, B, and C) in the above equation for the inscribed circle, so three equations that each use three landmark points can be used. Since there are four landmark points used in this example, all 4 combinations of points can be performed (i.e., "4 choose 3"). Thus, the circle 515 can be described as having a minimum least-squared distance (R) between the perimeter and the point that was left out. Next, θ can be determined by the average vector defined by the two eye landmarks and the two lip corners. From this, an imaginary line having length R and angle θ can be calculated. The image is then rotated by −θ, and cropped using the center of the circle 515 as a reference point and going 1.2R to the right and left of the center point, for a total length of 2.4R, and 2R above and below, for a total length of 4R, as illustrated in FIG. 5C. A non-limiting example of a normalization method that may be suitable for use herein is described by Jiansheng Chen, et al., in "Image Quality Assessment Based on Learning to Rank", IEEE Signal Processing Letters, Vol. 22, No. 1, pp. 90-94, 2015.

Figure 6:
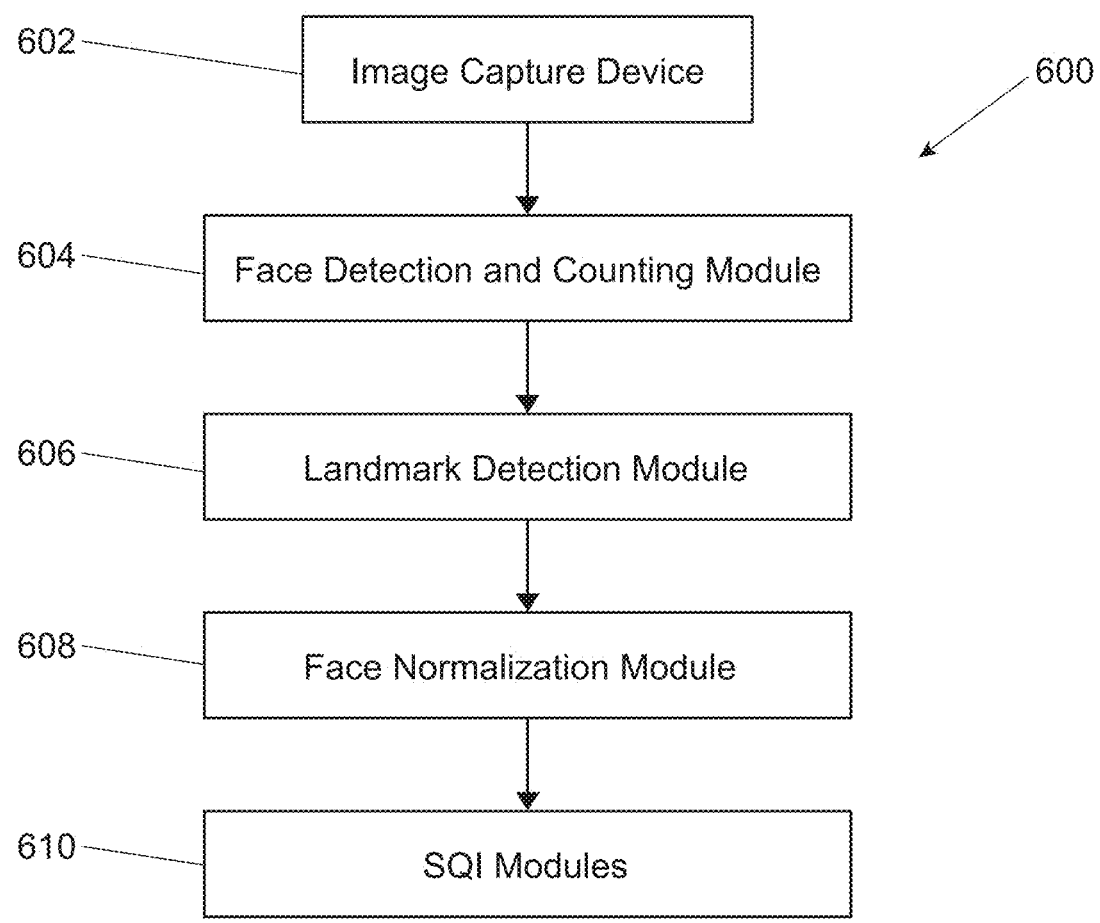
FIG. 6 is a block diagram illustrating the flow path thru the image processing module.
Figure 7:
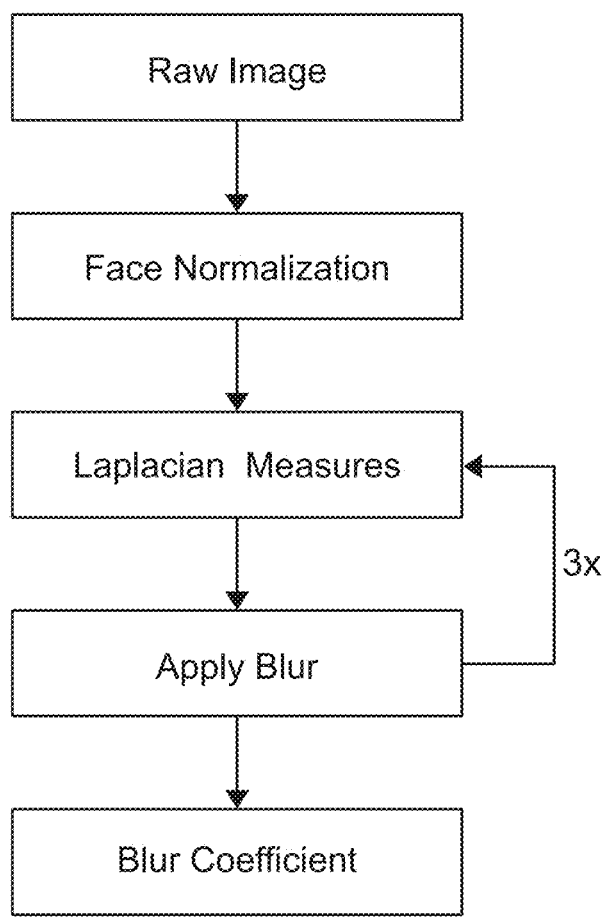
FIG. 7 is a block diagram illustrating the flow path thru the Blur Detection module.

FIG. 6 illustrates the flow path 600 of an image thru the pre-processing modules. In block 602 an image is captured by an image processing device. The image captured in block 602 is provided to the Face Detection and Counting Module 604. After a face is identified for further processing and/or analysis, the face detection information (e.g., face area bounding box) is passed to the Landmark Detection Module 606. The Landmark Detection Module 606 identifies facial landmarks, which may be predetermined or learned, using one or more landmark points. The landmark information and the captured image are then passed to the Face Normalization Module 608. The Face Normalization Module 608 can use the relationship (e.g., distance and/or angle) between two or more facial landmarks or landmark points to determine how much the image should be rotated.

Selfie Quality Index Modules

After processing by the image processing modules, the original image, detected landmarks, and the final registered image are passed to one or more SQI modules to determine image quality. Each SQI module may include one or more models (e.g., CNN) and, optionally, suitable controlling logic to perform its function/analysis. In some instances, the controlling logic may be part of the system's processing and/or training logic. Since the analysis conducted by each SQI module does not necessarily depend on the analysis results of any other module, the SQI modules do not need to operate sequentially. However, it may be desirable for 2 or more SQI modules to operate in series, and such embodiments are contemplated herein. Some nonlimiting examples of SQI modules that may be suitable for use in the present system and method include a Blur Detection module, a Distance to Camera module, a Face Ratio module, an Occlusion module, an Expression module, and an Illumination module. Each of the SQI modules herein may further include one or more sub-modules, which may function independently as discrete modules or collectively as a single module. For example, the present system may include an Illumination module that includes Direction, Location, Intensity, and/or Contrast sub-modules. Additionally or alternatively, the present system may include cheek and forehead sub-modules for the occlusion and/or expression modules. The sub-modules may each provide an input to the SQI score, or the scores from each sub-module may be combined to provide a composite score for the module, which is then used in the calculation of the SQI score.

In some instances, if a feature vector does satisfy a predetermined threshold level of quality, the system may communicate to a user (e.g., via a visual or audio cue from the mobile computing device) that that particular feature is unsatisfactory and/or prompt the user to retake the selfie. In some instances, the system may provide helpful tips that indicate how to improve an unsatisfactory feature.

The image analysis results of the SQI modules can be used to determine whether the selfie is of sufficient quality to be analyzed by the analyzing logic of the system. If a particular feature or feature vector does not meet an acceptable threshold level of quality ("low-quality feature"), then the system may prevent the image from passing to the analyzing logic. In some instances, the system may require more than one low-quality feature to be detected by the SQI modules before preventing the image from passing to the analyzing logic. In some instances, the SQI modules may be configured to provide a binary indication (i.e., 0,1) of whether a feature meets an acceptable threshold level of quality. In some instances, an SQI module may be configured to provide a scaled score based on a continuum of lowest quality to highest quality (e.g., 1 to 10 or even 1 to 100). For example, on an increasing quality scale, a module may assign a score of 1 or even zero to the lowest quality example of the feature it is trained to recognize and a score of 10 or even 100 to the highest quality example of the feature it is trained to recognize. Conversely, on a decreasing quality scale, a module may assign a score of 1 or even zero to the highest quality example of the feature it is trained to recognize and a score of 10 or even 100 to the lowest quality example of the feature it is trained to recognize. The scores from some or all of the modules may be combined to provide an overall SQI score, which can, optionally, be compared to a threshold score. In some instances, the analysis results of an SQI module may be weighted to contribute more (or less) to the SQI score than another module.

In some instances, the SQI modules may include a Blur Detection module. Blurry images tend to produce less accurate image analysis results, and thus it would be desirable to analyze selfies with minimal blurriness. The Blur Detection module measures the amount of blur or lack of focus in the selfie image, which can then be used individually and/or as part of the SQI score to improve selfie quality.

The Blur Detection module may be configured as a CNN trained by a blur feature vector formed from several features that have been extracted and fused together. One feature that may be used to form the blur feature vector is a blur coefficient. In some instances, the blur coefficient may be generated by taking the differences between Laplacian measures on a normalized image after several consecutive rounds of blurring. Additionally or alternatively, the max, mean, absolute sum, and/or standard deviation of the Laplacian measures may be used to form part or all of the blur feature vector. An exemplary method of generating a blur coefficient is described by Frédérique Crété-Roffet, et al., in "The Blur Effect: Perception and Estimation with a New No-Reference Perceptual Blur Metric", SPIE Electronic Imaging Symposium Conf. Human Vision and Electronic Imaging, January 2007, San Jose, United States. XII, pp. EI 6492-16, 2007.

In some instances, the blur feature vector may include features extracted from the last layer of an Alexnet convolutional neural network trained using, for example, a Tree-Bagger classifier (i.e., a bootstrap-aggregated ("bagged") decision tree). An Alexnet CNN refers to the CNN described by Alex Krizhevsky, et al., in "ImageNet Classification with Deep Convolutional Neural Networks," part of "Advances in Neural Information Processing Systems 25" (NIPS 2012). The Alexnet CNN utilizes a computer vision approach to deep learning. This approach converts the image (e.g., a selfie or normalized facial image) into a histogram of traditional computer vision features such as, for example, Local Binary Patterns ("LBP") or Histogram of Gradients ("HoG") features, which have been developed to look for patterns within an image. Once a histogram has been generated for every image in a training set, the histograms can be used as representative features to teach the CNN. Bootstrap-aggregated decision trees combine the results of individual decision trees to reduce the effects of overfitting and improve generalization. Techniques for selecting suitable TreeBagger classifiers are known to those skilled in the art.

After analyzing the image, the Blur Detection module may quantify the amount of blur detected in the image ("blur detection score") using a binary value (e.g., "good" or "bad") or a scaled value (e.g., a value of 1 to 10) and provide a score to the controlling application, processing logic, and/or analyzing logic. In some instances, the score and/or other results of the analysis by the Blur Detection module may be provided to the system's training logic to further train the Blur Detection module. The score of the Blur Detection module may be combined with output from other SQI modules, for example as a feature vector, to generate the SQI score.

In some instances, the blur detection score may be provided to a user via a display. If the blur detection score is below a threshold value, the system may communicate to the user that blurriness was detected in the image. For example, if the Blur Detection module quantifies the amount of blur detected in an image as being between 4 and 7, on a scale of 1 to 10, then the system may provide indicate to a user that there is blur present in the image, but still allow the image to be analyzed, if desired. Continuing with this example, if the blur detection score is less than 4, the system may indicate to the user that the image is too blurry and/or request that the user retake the image. In some instances, the system may provide tips to the user for decreasing the amount of blur in an image.

In some instances, the SQI modules may include a Distance to Camera module ("DtoC module"), which may be in the form of a trainable model (e.g., CNN). The DtoC module may calculate the ratio of detected pixels in the bounding box to the overall image size, which typically ranges from x to y, and correlate this ratio to the distance of the face from the camera. If the ratio of bounding box pixels to image size is too high (e.g., greater than 0.8, 0.9, or even greater than 1), then the system may indicate to the user that camera is too close to the face and/or request that the user retake the selfie. If the ratio of bounding box pixels to image size is too low (e.g., less than 0.4, 0.3, or even less than 0.2), then the system may indicate to the user that camera is too far away from the face and/or request that the user retake the selfie.

Additionally or alternatively, the DtoC module may use known anthropometric data as a calibration target. That is, known distances between different landmark features or landmark points on the face of a person can be used as targets (e.g., quasi "ground truths") when training a regression model at different image capture distances. For example, the model used by the DtoC module may be trained using a suitable number of images (e.g., 20-1000, 25-500, or even 30-100) collected from different image capture devices (e.g., iPhone 6, iPhone 6+, and Samsung Galaxy S7) at different distances (e.g., 12," 24," and 36"). The detected distances can then be compared to the known anthropometric data to determine the accuracy of the model. A non-limiting example of a method of using anthropometric data as a calibration target is described by I. König, et al., in "A new context: Screen to face distance", 2014 8th International Symposium on Medical Information and Communication Technology (ISMICT), pages 1-5. IEEE, 2014.

The DtoC module may determine a capture distance by calculating the number of pixels between certain facial features detecting in the image. For example, the DtoC module may determine capture distance by calculating the number of pixels between two or more of the 68 landmark points identified by the Landmark Detection module. In some instances, the DtoC module may use some of or even all the landmark points from the Landmark Detection Module to detect various anthropometric distances such as, for example, interpupillary breadth (distance between pupils), biocular breadth (distance between the outer corners of the eyes), bitragoin breadth (face width), menton-subnasal length (distance between the bottom of the nose and the upper lip), and face length. Of these, it may be particularly desirable to use interpupilary breadth, biocular breadth, and menton-sub nasal length to train the model.

The DtoC module may generate a distance to camera score, which can be a binary score, a scaled score, or even the actual distance from the camera as determined by the module. The distance to camera score may be used in the generation of an SQI score, providing an indication to a user that the distance to camera is too far or too close, providing a distance to camera score to a user, providing tips on how to achieve a better distance to camera score, and/or training the DtoC module.

The SQI modules herein may include an Occlusion Detection module to determine if there is an object blocking the face or a portion of the face that undesirably affects image quality. Some nonlimiting examples of occlusions that may be detected by the module include hair on the forehead and/or cheeks or a hand or other object (e.g., eyeglasses, hands, hats, and collars in front of the face) on or in front of the face. A label for each region of the face, as well as confidence measure may be generated by the Occlusion Detection Module. In some instances, one or more computer-vision-based LBP features and one or more CNN-based Alexnet features may be fused to generate an occlusion feature vector. The Occlusion Detection Module may be trained using a Tree Bagger classifier.

The Occlusion module may generate an occlusion score, which can be a binary score (e.g., occlusion or no occlusion), a scaled score, or a combination of these. The occlusion score may be used to help generate an SQI score, provide an indication to a user that there is an object blocking the face or a portion of the face, request that the user retake the image without the occlusion present, and/or train the Occlusion module.

The SQI modules herein may include an Expression Module that analyzes the selfie to determine if there is a facial expression present. The changes in the size, shape, and/or position of facial macro features and facial micro features caused by facial expressions can undesirably affect the analysis of the image by the analyzing logic, leading to less accurate results. Thus, in the present system, it is desirable to analyze a selfie in which the face has a neutral expression, rather than one that includes an emotional expression (e.g., a smile, laugh, frown, or look of surprise, fear, disgust, or anger).

The Expression module may include a model based on a computer vision technique (e.g., LBP or HoG), a deep learning technique (e.g., a CNN), or a combination of these. The module may examine the entire face or only a portion of the face (e.g., cheek, forehead, mouth, or other region(s) of interest) to determine whether there is an emotional or neutral expression present. If an emotional expression is present, then the system may prevent the image from being passed to the analyzing logic for analysis and/or provide an indication to a user that an emotional expression was detected in the image. For example, the system may tell the user "it appears that you are smiling."

In some instances, the Expression module may quantify the degree to which a facial expression affects the quality of the selfie. For example, the Expression module may generate an expression score, which can be binary (e.g., indicating whether there is an expression present or not), scaled (e.g., 1 to 10, where 1 indicates an extreme emotional expression and 10 represents a neutral expression), or a combination of these. The expression score may be used to help generate an SQI score, indicate to a user that an expression was detected in the image which affects image quality, request that the user retake the image with a neutral expression, and/or train the Expression module.

The SQI modules may include an Illumination module to determine whether a selfie taken by a user has adequate lighting conditions. If the lighting conditions are inadequate, the system may not be able to determine the desired qualitative metrics. Because there are a variety of different modalities of illumination to consider, when it comes to determining whether the desired facial metrics can be extracted successfully, it may be desirable to consider a variety of different illumination factors. The selected illumination factors may be configured as sub-modules in the Illumination module. The analysis output of the sub-modules may be used individually or collectively to determine an illumination feature vector for use in calculating the SQI score. In some instances, the illumination factors to be analyzed by one or more illumination sub-modules include the direction of illumination, location of illumination, contrast, and intensity of illumination.

The direction of illumination is important because, ideally, there would be even lighting across the face when the selfie is taken. Even lighting helps ensure that features of interest (e.g., wrinkles or uneven pigmentation) are not obscured or washed out. However, the lighting conditions in which a selfie is taken are often not ideal, and there may be multiple sources of lighting. Thus, the Direction of Illumination sub-module provides an indication of which direction the lighting in an image is biased towards. In some instances, the Direction of Illumination sub-module may provide feedback to a user to change the light source and/or the direction of the lighting in a certain way.

In some instances, the Direction of Illumination ("DoI") sub-module may use a computer vision technique to create a histogram of gradients for the desired features. For example, the DoI module may count occurrences in localized portions of the normalized image, which should be similar for images where there is a similar angle of illumination. The feature HoGs and assigned labels can then be analyzed using a suitable algorithm(s) (e.g., polynomial kernel support vector machines), which are known to those skilled in the art of computer modelling. In some instances, the DoI module may include classifiers for different classes of illumination directions corresponding to left, right, top, bottom, and/or even. The DoI sub-module may provide an indication of the direction of illumination detected by the sub-module. In some instances, the DoI sub-module may generate a direction of illumination quality score what can be used as a feature in the illumination feature vector generated by the Illumination module or to provide feedback to a user regarding the direction of illumination and/or quality of the image.

The Illumination module herein may include an Illumination Intensity sub-module, which uses a combination of features to qualify the image. In some instances, the Illumination Intensity sub-module may extract LBP features from the normalized image using computer vision (e.g., HoG) and/or deep learning (e.g., Alexnet) techniques, and then fuse the LBP features with a gray-scale histogram and a perceived brightness metric. Perceived brightness may be determined according to the following formula.

$$\text{Perceived Brightness} = (0.241R^2 + 0.691G^2 + 0.068B^2)^{1/2}$$

where: R, G, and B are the color values from the Red, Green, Blue ("RGB") color model.

The Illumination Intensity sub-module may provide an indication of the intensity of the illumination detected by the sub-module. In some instances, the Illumination Intensity sub-module may generate a quality score (e.g., binary, scaled, or combination of these) that can be used as a feature in the illumination feature vector or to provide feedback to a user regarding the intensity of the illumination and/or quality of the image.

The Illumination module herein may include an Illumination Contrast sub-module that correlates features generated from multiple sources to ground-truth labels. If there is insufficient contrast in the image, it may be difficult for the system to distinguish facial macro features and/or micro features from each other and/or the image background, which could undesirably affect the analysis by the analyzing logic. The features used in the Illumination Contrast sub-module may be the same as or similar to those used in the Illumination Intensity sub-module (e.g., LBP features fused with a Hue, Saturation, and Value (HSV) color space histogram and a perceived brightness metric). The Illumination Contrast sub-module may provide an indication of the illumination contrast detected by the sub-module. In some instances, the Illumination Contrast sub-module may generate a quality score (e.g., binary, scaled, or combination of these) that can be used as a feature in the illumination feature vector or to provide feedback to a user regarding the intensity of the illumination and/or quality of the image.

In some instances, the Illumination module may include an Illumination Location ("IL") sub-module that can determine whether the image is captured in an indoor or an outdoor environment. Unlike the other Illumination sub-modules, which use the normalized image, the IL sub-module uses the entire selfie image for training and testing. The IL sub-module can be trained to identify non-lighting specific cues such as trees, roads, etc. in the outdoor case, and furniture, sinks, etc. in the indoor case. The IL sub-module may be configured to use the same set of features as the Illumination Contrast sub-module (e.g., LBP features).

Convolutional Neural Network

The systems and methods herein, including the analyzing logic and at least some of the image quality modules use a trained convolutional neural network, which functions as an in silico skin model. The CNN is used to analyze a selfie or portion thereof and determine a desired metric. An example of a deep learning in silico skin model (i.e., CNN) that may be suitable for use in the present system is described in co-pending U.S. Ser. No. 15/465,292 filed by Sherman, et al. The CNNs herein may comprise multiple layers of neuron collections that use the same filters for each pixel in a layer. Using the same filters for each pixel in the various combinations of partially and fully connected layers reduces memory and processing requirements of the system. In some instances, the CNN comprises multiple deep networks, which are trained and function as discrete convolutional neural networks for an image, image segment, and/or region of interest.

Figure 8:
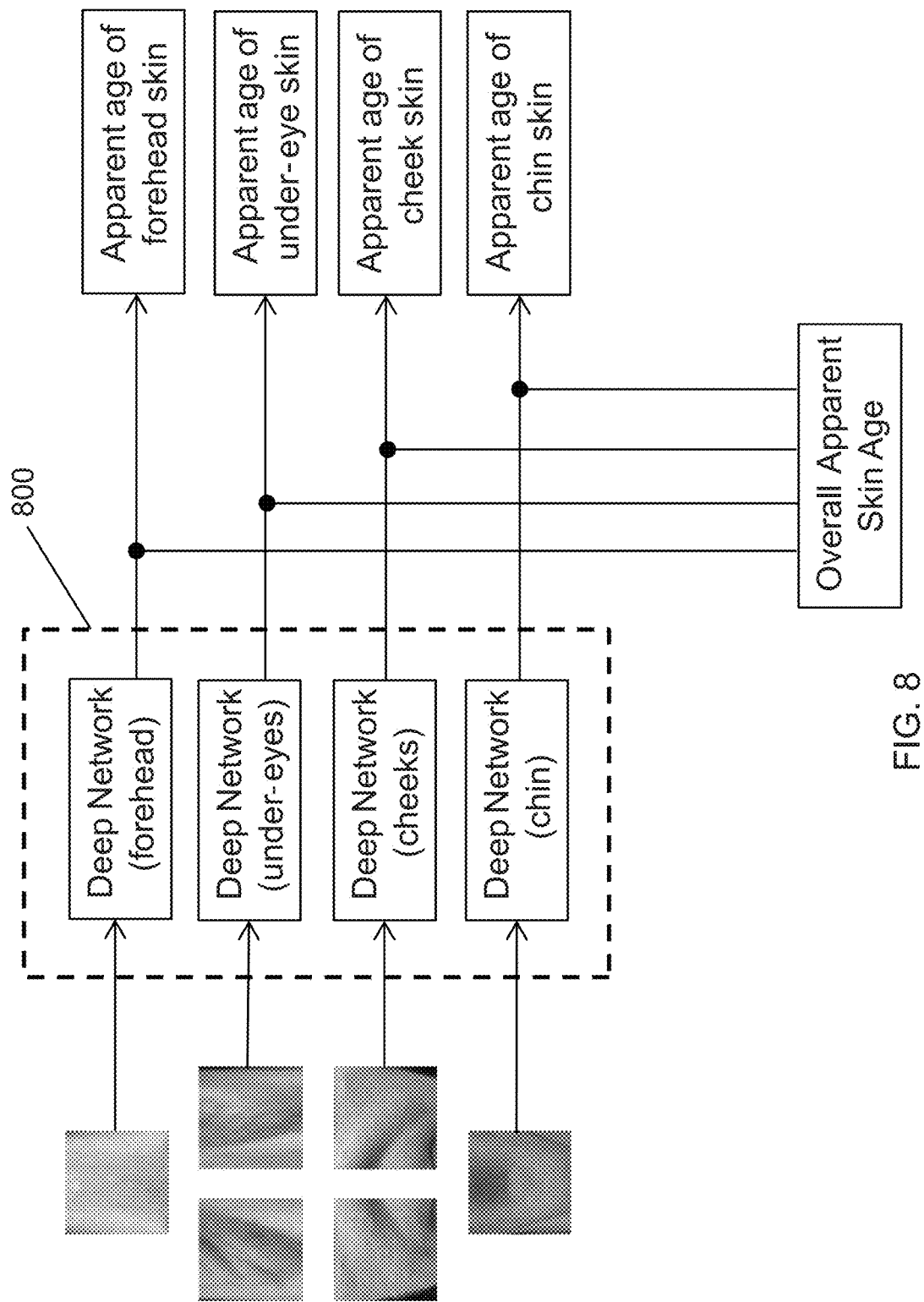
FIG. 8 illustrates an example of a convolutional neural network.

FIG. 8 illustrates an example of a CNN configuration for use herein. As illustrated in FIG. 8, the CNN 800 includes four individual deep networks for analyzing individual regions of interest or portions thereof, which in this example may include portions of the forehead, under-eye area, cheeks/nasolabial folds, and chin regions of interest. Of course, it is to be appreciated that the CNN may include fewer deep networks or more deep networks, as desired. The image analysis results from each deep network may be used to provide a feature vector for its respective region of interest.

The CNN herein may be trained using a deep learning technique that allows the CNN to learn what portions of an image contribute to the feature of interest, much in the same way as a mammalian visual cortex learns to recognize important features in an image. For example, the CNN may be trained to determine locations, colors, and/or shade (e.g., lightness or darkness) of pixels that contribute to a feature in an image. In some instances, the CNN training may involve using mini-batch stochastic gradient descent (SGD) with Nesterov momentum (and/or other algorithms). An example of utilizing a stochastic gradient descent is disclosed in U.S. Pat. No. 8,582,807.

In some instances, the CNN may be trained by providing an untrained CNN with a multitude of captured images to learn from. In some instances, the CNN can learn to identify features in an image that contribute to the desired feature vector through a process called supervised learning. "Supervised learning" generally means that the CNN is trained by analyzing images in which the desired feature vector in the image is predetermined. Depending on the accuracy desired, the number of training images may vary from a few images to a multitude of images (e.g., hundreds or even thousands) to a continuous input of images (i.e., to provide continuous training).

Figure 9:
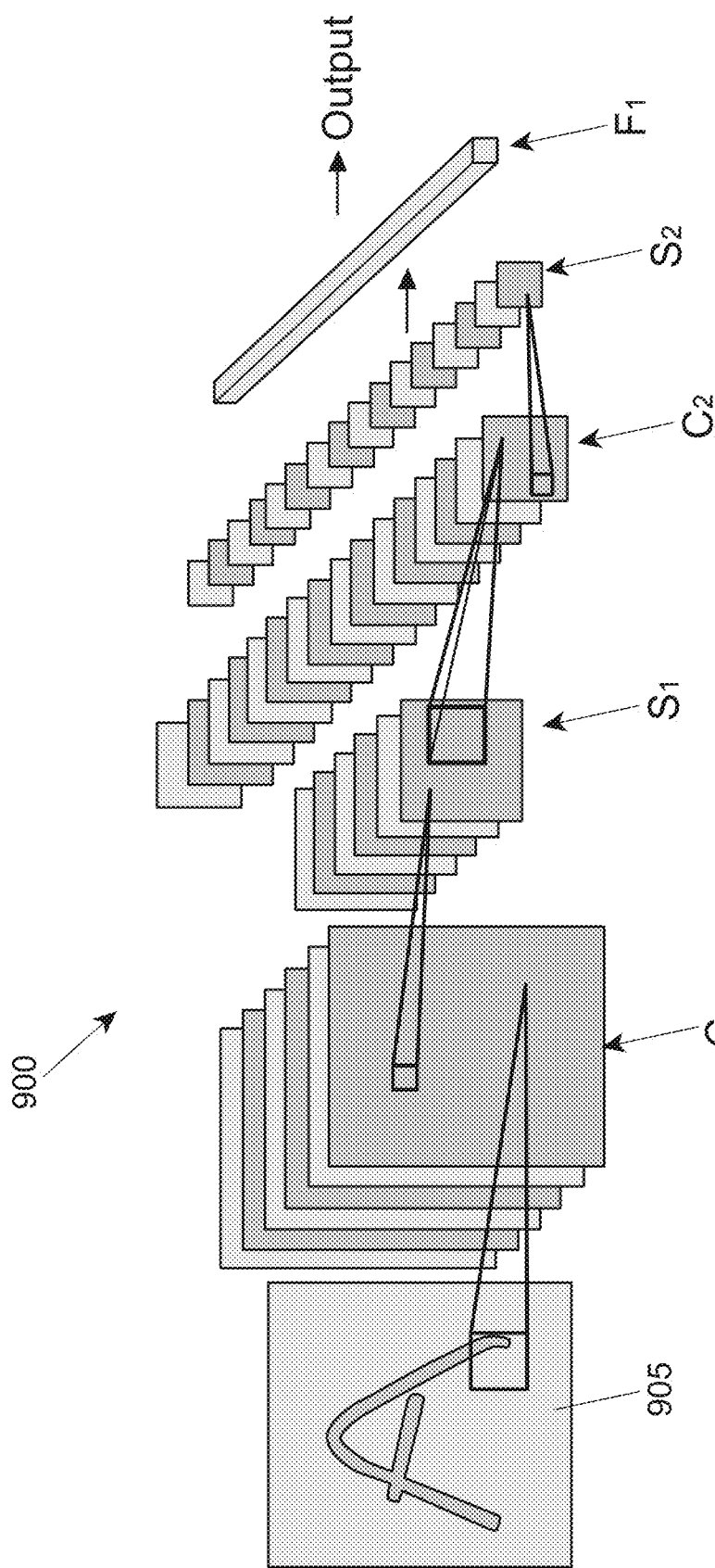
FIG. 9 illustrates an example of a convolutional neural network.

FIG. 9 illustrates an example of a convolutional neural network 900 for use herein. The CNN 900 may include an inputted image 905 (e.g., region of interest or portion thereof), one or more convolution layers $C_1$, $C_2$, one or more subsampling layers $S_1$ and $S_2$, one or more partially connected layers, one or more fully connected layers, and an output. To begin an analysis or to train the CNN, an image 905 is inputted into the CNN 900 (e.g., the image of a user). The CNN may sample one or more portions of the image to create one or more feature maps in a first convolution layer $C_1$. For example, as illustrated in FIG. 9, the CNN may sample six portions of the image 905 to create six features maps in the first convolution layer $C_1$. Next, the CNN may subsample one or more portions of the feature map(s) in the first convolution layer $C_1$ to create a first subsampling layer $S_1$. In some instances, the subsampled portion of the feature map may be half the area of the feature map. For example, if a feature map comprises a sample area of 29×29 pixels from the image 905, the subsampled area may be 14×14 pixels. The CNN 900 may perform one or more additional levels of sampling and subsampling to provide a second convolution layer $C_2$ and a second subsampling layer $S_2$. It is to be appreciated that the CNN 900 may include any number of convolution layers and subsampling layers as desired. Upon completion of final subsampling layer (e.g., layer $S_2$ in FIG. 9), the CNN 900 generates a fully connected layer Fi, in which every neuron is connected to every other neuron. From the fully connected layer Fi, the CNN can generate an output related to a metric of image quality.

Example: Generating an SQI Score

A user takes a selfie using a conventional smart phone camera (e.g., Apple iPhone® 5 brand smartphone or Samsung Galaxy® S6 brand smartphone, newer versions of these, and the like). The smart phone includes a native application (i.e., an application stored on the device itself) that provides the selfie to a remote computer for analysis. It is to be appreciated that the selfie may also be provided to the remote computer for analysis via a web based application (i.e., an application launched from a website accessed via the internet browser software stored on the mobile computing device) or the selfie may be analyzed by the mobile computing device, if it has sufficient processing power and memory to support the processing logic and/or analyzing logic required for analysis. In this example, if the Face Counting and Detection module or Landmark Detection module fails to detect a face or a suitable landmark, or detects more than one face, then the SQI score is returned as 0 and the user is prompted to retake the selfie. If the Face Detection, Landmark Detection, and Face Normalization modules run successfully (i.e., a single face is identified and isolated, the desired facial landmarks are detected, and the face is normalized), then the normalized image is passed to the SQI modules for analysis.

The system in this example uses three variables to calculate the SQI score. The first variable is the Confidence Score. The confidence score is a number between 0 and 1 and is a quantification of the feature vector from each SQI module (i.e., it is the occlusion score from Occlusion module, the blur score from the Blur module, the expression score from the Expression module, etc.). For machine learning based modules, the Confidence Score is the distance from the hyperplane of the support vector machine. For the Distance to Camera module it is the ratio of pixels in the bounding box to image size. In this example, a total of nine confidence scores are returned from the SQI modules. The quality metrics analyzed in this example are: cheek occlusion, forehead occlusion, cheek expression, forehead expression, blur, illumination direction, illumination contrast, illumination intensity, and distance to camera.

The second variable used to calculate the SQI score is Module Weight, which reflects the importance of each SQI module on the SQI score. In this example, illumination is deemed to be more important than the other quality metrics, and thus the Illumination modules (i.e., Direction, Contrast, and Intensity) are given a Module Weight of 0.2 whereas the other SQI modules receive a Module Weight of 0.1. In some instances, it may be desirable to weight the SQI modules according to user behavior. For example, if a user fails to follow prompts to improve a low-quality feature (e.g., occlusion), then the corresponding module may be weighted to compensate for the user's lack of correction.

The third variable used to calculate the SQI score is Prediction Category Score, which reflects a category classification prediction provided by each SQI module. The occlusion modules (cheek and forehead) predict whether the selfie belongs to a "No occlusion" or "presence of an occlusion" category (i.e., YES or No category). The SQI modules may have any number of categories predicted for a selfie (e.g., 2, 3, 4, or even 5 or more). Of the prediction categories for each module, at least one is a "positive" category and the rest are "negative" category(ies). Positive categories are given a Prediction Category Score of +1 and negative categories are given a Prediction Category Score of −1. In this example, nine Prediction Category Scores are used to calculate the SQI score. The prediction categories in this example are shown in Table 1 below.

TABLE 1

| Module/Sub-module | Positive Category(ies) | Negative Category(ies) |
| --- | --- | --- |
| Distance to Camera | Ideal | Far, Near |
| Expression/Cheek | Neutral | Not Neutral |
| Expression/Forehead | Neutral | Not Neutral |
| Illumination/Contrast | High | Low |
| Illumination/Intensity | High | Low |
| Illumination/Quality | Good | Poor |
| Illumination/Direction | Even | Top, Bottom, Left, Right |

TABLE 1-continued

| Module/Sub-module | Positive Category(ies) | Negative Category(ies) |
| --- | --- | --- |
| Blur | Good | Blurry, Grainy |
| Occlusion | Absent | Present |

The SQI score is calculated by multiplying the Confidence Score×Module Weight×Prediction Category Score for each SQI module, and then calculating the max-min normalized sum across all 9 SQI modules/sub-modules.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for improving the quality of a selfie, comprising:
 a. an image capture device;
 b. a computer coupled to the image capture device, the computer comprising a non-transitory memory component with logic stored thereon, wherein the logic comprises
  i) an image processing module that causes the computer to locate a face in a selfie captured by the image capture device and provided to the computer, locate at least one landmark facial feature present on the face, and normalize the selfie, and
  ii) a selfie quality index (SQI) module that causes the computer to analyze the normalized selfie for a quality metric selected from occlusion, blur, distance-to-camera, facial expression, illumination, and combinations of these, wherein the system uses the analyzed image quality metric to generate an SQI score,
  iii) wherein the SQI module comprises a Blur Detection Module in the form of a CNN trained by a blur feature vector formed from at least one of a blur coefficient and a feature extracted from the last layer of an Alexnet CNN, wherein the blur coefficient is generated by taking the differences between Laplacian measures on the normalized image after several consecutive rounds of blurring; and c. a display coupled to at least one of the image capture device and the computing device.

2. The system of claim 1, wherein the image processing module comprises a Face Detection and Counting Module that isolates at least a portion of the face from background features present in the selfie using a bounding box.

3. The method of claim 2, wherein the SQI module comprises a Distance to Camera Module that determines the distance-to-camera image quality metric by calculating a ratio of pixels in the bounding box to image size.

4. The method of claim 3, wherein the logic causes the computer to communicate to a user that the image capture device is too close when the ratio of pixels in the bounding box to image size is greater than 0.8.

5. The method of claim 3, wherein the logic causes the computer to communicate to a user that the image capture device is too far away when the ratio of pixels in the bounding box to image size is less than 0.4.

6. The system of claim 1, wherein the image processing module comprises a Landmark Detection Module in the form of a convolutional neural network (CNN) to determine if the at least one landmark is present.

7. The method of claim 6, wherein the SQI module comprises a Distance to Camera Module that determines the distance-to-camera image quality metric by comparing a pixel based distance between at least two landmark points in the selfie to a known average distance between said landmark points for a population.

8. The system of claim 1, wherein the image processing module comprises a Face Registration Module that causes the system to normalize the face based on positions of at least 4 facial landmark points.

9. The system of claim 1, wherein the SQI module comprises an Occlusion Module that analyzes the normalized image for the occlusion image quality metric, and wherein the Occlusion Module generates an occlusion feature vector formed by fusing at least one local binary pattern feature with at least one CNN-based Alexnet feature.

10. The method of claim 1, wherein the SQI module comprises an Expression Module that analyzes the normalized selfie for the expression image quality metric, and wherein the Expression Module applies a local binary pattern, histogram of gradients, deep learning technique, or combination of these to determine an expression feature vector.

11. The method of claim 1, wherein the SQI module comprises an Illumination Module that analyzes the normalized selfie for the illumination image quality metric.

12. The method of claim 11, wherein Illumination Module includes at least one sub-module for determining a direction of illumination, an intensity of illumination, contrast, and location of illumination.

* * * * *

UNITED STATES PATENT AND TRADEMARK OFFICE
CERTIFICATE OF CORRECTION

PATENT NO. : 10,574,883 B2
APPLICATION NO. : 15/993973
DATED : February 25, 2020
INVENTOR(S) : Ankur Purwar et al.

It is certified that error appears in the above-identified patent and that said Letters Patent is hereby corrected as shown below:

In the Claims

Claim 3 should read:
The system of claim 2, wherein the SQI module comprises a Distance to Camera Module that determines the distance-to-camera image quality metric by calculating a ratio of pixels in the bounding box to image size.

Claim 4 should read:
The system of claim 3, wherein the logic causes the computer to communicate to a user that the image capture device is too close when the ratio of pixels in the bounding box to image size is greater than 0.8.

Claim 5 should read:
The system of claim 3, wherein the logic causes the computer to communicate to a user that the image capture device is too far away when the ratio of pixels in the bounding box to image size is less than 0.4.

Claim 7 should read:
The system of claim 6, wherein the SQI module comprises a Distance to Camera Module that determines the distance-to-camera image quality metric by comparing a pixel based distance between at least two landmark points in the selfie to a known average distance between said landmark points for a population.

Claim 10 should read:
The system of claim 1, wherein the SQI module comprises an Expression Module that analyzes the normalized selfie for the expression image quality metric, and wherein the Expression Module applies a local binary pattern, histogram of gradients, deep learning technique, or combination of these to determine an expression feature vector.

Signed and Sealed this
Twenty-eighth Day of April, 2020

Andrei Iancu
*Director of the United States Patent and Trademark Office*

CERTIFICATE OF CORRECTION (continued)
U.S. Pat. No. 10,574,883 B2

Claim 11 should read:
The system of claim 1, wherein the SQI module comprises an Illumination
Module that analyzes the normalized selfie for the illumination image quality metric.

Claim 12 should read:
The system of claim 11, wherein Illumination Module includes at least
one sub-module for determining a direction of illumination, an intensity of illumination, contrast,
and location of illumination.